US012617100B2

(12) United States Patent (10) Patent No.: US 12,617,100 B2
Parwal et al. (45) Date of Patent: May 5, 2026

(54) COUNTERTOP COOKING ROBOT

(71) Applicant: Epifeast Inc., San Mateo, CA (US)

(72) Inventors: Raghav Parwal, San Mateo, CA (US);
Aditya Gupta, San Mateo, CA (US);
Rohin Malhotra, San Mateo, CA (US);
Hari Surya, San Mateo, CA (US);
Raghav Gupta, San Mateo, CA (US);
Shubham Sharma, San Mateo, CA
(US); Tushar Kumar, San Mateo, CA
(US)

(73) Assignee: Epifeast Inc., San Mateo, CA (US)

( * ) Notice: Subject to any disclaimer, the term of this
patent is extended or adjusted under 35
U.S.C. 154(b) by 40 days.

(21) Appl. No.: 19/001,845

(22) Filed: Dec. 26, 2024

(65) Prior Publication Data

US 2025/0214256 A1 Jul. 3, 2025

Related U.S. Application Data

(60) Provisional application No. 63/615,467, filed on Dec.
28, 2023.

(51) Int. Cl.
B25J 11/00 (2006.01)
B25J 9/16 (2006.01)
(Continued)

(52) U.S. Cl.
CPC ......... B25J 11/0045 (2013.01); B25J 9/1679
(2013.01); B25J 18/04 (2013.01); **B25J
19/023** (2013.01)

(58) Field of Classification Search
CPC ...... B25J 11/0045; B25J 9/1679; B25J 18/04;
B25J 19/023
(Continued)

(56) References Cited

U.S. PATENT DOCUMENTS 6,843,166 B1 * 1/2005 Li ........................... A47J 27/14
99/332
7,174,830 B1 * 2/2007 Dong .................... B25J 9/0087
99/348
(Continued)

FOREIGN PATENT DOCUMENTS

WO 2019123472 A1 6/2019
WO 2022089278 A1 5/2022

OTHER PUBLICATIONS

International Search Report and Written Opinion from correspond-
ing International Patent Application No. PCT/US2024/061909 dated
Apr. 7, 2025.

*Primary Examiner* — Jaime Figueroa
(74) *Attorney, Agent, or Firm* — Dergosits & Noah LLP;
Todd A. Noah

(57) ABSTRACT

A countertop cooking appliance that uses machine learning
models to automatically prepare a plurality of different
meals is described. The appliance includes a micro dispens-
ing system containing a plurality of pods having granular
contents. The pod rotation mechanism moves a selected pod
into a position above a pan to dispense the granular contents.
The rotation element rotates the selected pod to dispense an
amount of granular content from the dispensing section with
each rotation of the selected pod by the rotation element. The
appliance may also include a stirrer that uses at least one
spatula to gradually contact substantially an entire area of
the pan after the stirrer completes a rotation cycle. Control
circuitry coupled to a macro ingredient delivery system, the
micro dispensing system, the stirrer, a heating element, and
sensors performs recipe methods using a plurality of com-
puter vision models to monitor recipe progress.

20 Claims, 23 Drawing Sheets

(51) Int. Cl.
*B25J 18/04* (2006.01)
*B25J 19/02* (2006.01)

(58) Field of Classification Search
USPC .................. 700/245–264; 318/568.11–568.25
See application file for complete search history.

(56) References Cited

U.S. PATENT DOCUMENTS

| | | | | |
|---|---|---|---|---|
| 10,512,366 B1* | 12/2019 | Kadoch | ............... | G01F 15/001 |
| 11,192,258 B2* | 12/2021 | Sinnet | ................. | B25J 15/0253 |
| 11,738,466 B1* | 8/2023 | Gross | .................... | B25J 13/003 |
| | | | | 219/681 |
| 11,969,878 B2* | 4/2024 | Pashut | ................. | B25J 11/0045 |
| 12,005,590 B2* | 6/2024 | Bhageria | ............... | B25J 9/1653 |
| 12,275,130 B2* | 4/2025 | Pashut | ................. | B25J 15/0033 |
| 2014/0069282 A1* | 3/2014 | He | .......................... | A47J 44/02 |
| | | | | 99/348 |
| 2014/0335243 A1* | 11/2014 | Israni | .................... | A21C 1/003 |
| | | | | 426/233 |
| 2015/0114236 A1* | 4/2015 | Roy | ........................ | A47J 44/00 |
| | | | | 901/41 |
| 2016/0067866 A1* | 3/2016 | Sekar | ...................... | A47J 44/00 |
| | | | | 99/348 |
| 2017/0348854 A1* | 12/2017 | Oleynik | .................. | A47J 47/02 |
| 2018/0001283 A1* | 1/2018 | Altenritter | .......... | A47J 36/2483 |
| 2018/0140132 A1* | 5/2018 | He | .......................... | A47J 43/04 |
| 2019/0193263 A1* | 6/2019 | Raidi | ...................... | A47J 44/00 |
| 2019/0291277 A1* | 9/2019 | Oleynik | ................. | B25J 9/1669 |
| 2020/0047349 A1* | 2/2020 | Sinnet | ...................... | B25J 5/007 |
| 2020/0254616 A1* | 8/2020 | Ebrahimi Afrouzi | ....................... |
| | | | | G05D 1/0016 |
| 2020/0290208 A1* | 9/2020 | Ha | ........................ | G05D 1/0246 |
| 2020/0375405 A1* | 12/2020 | He | ........................ | B25J 11/0045 |
| 2021/0174370 A1* | 6/2021 | Yim | ................. | G06Q 10/06316 |
| 2021/0196081 A1* | 7/2021 | Kodali | .................. | B25J 11/008 |
| 2021/0394371 A1* | 12/2021 | Ishizu | ................. | A47J 43/0711 |
| 2022/0097239 A1* | 3/2022 | Fujita | .................. | G05B 19/042 |
| 2022/0142397 A1* | 5/2022 | Fujita | ...................... | A47J 36/32 |
| 2022/0279975 A1* | 9/2022 | Nashida | .............. | B25J 11/0045 |
| 2023/0098024 A1* | 3/2023 | Ghafari | .................. | A47J 36/32 |
| | | | | 99/326 |
| 2023/0405834 A1 | 12/2023 | Pashut | | |

\* cited by examiner

200

230

205

210

215

220

225

250

265

700

710
Retrieve recipe from memory

720
Activate heating module

730
Request granular content, cause carousel to stop

740
Command rotation element to rotate number of times required by recipe

750
Monitor and regulate operation of stirrer and heating element

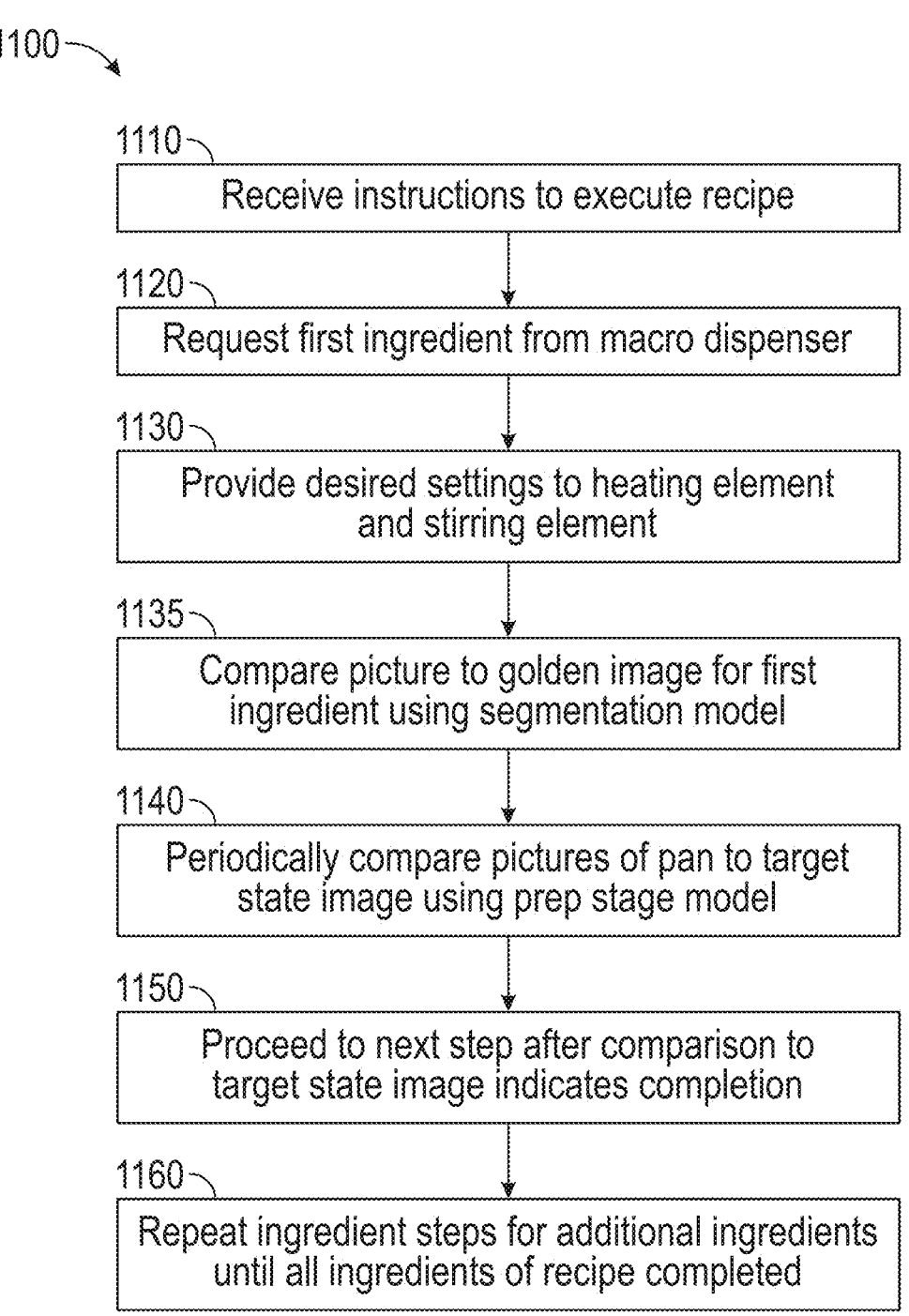

1100

1110
Receive instructions to execute recipe

1120
Request first ingredient from macro dispenser

1130
Provide desired settings to heating element and stirring element

1135
Compare picture to golden image for first ingredient using segmentation model 1140
Periodically compare pictures of pan to target state image using prep stage model 1150
Proceed to next step after comparison to target state image indicates completion 1160
Repeat ingredient steps for additional ingredients until all ingredients of recipe completed

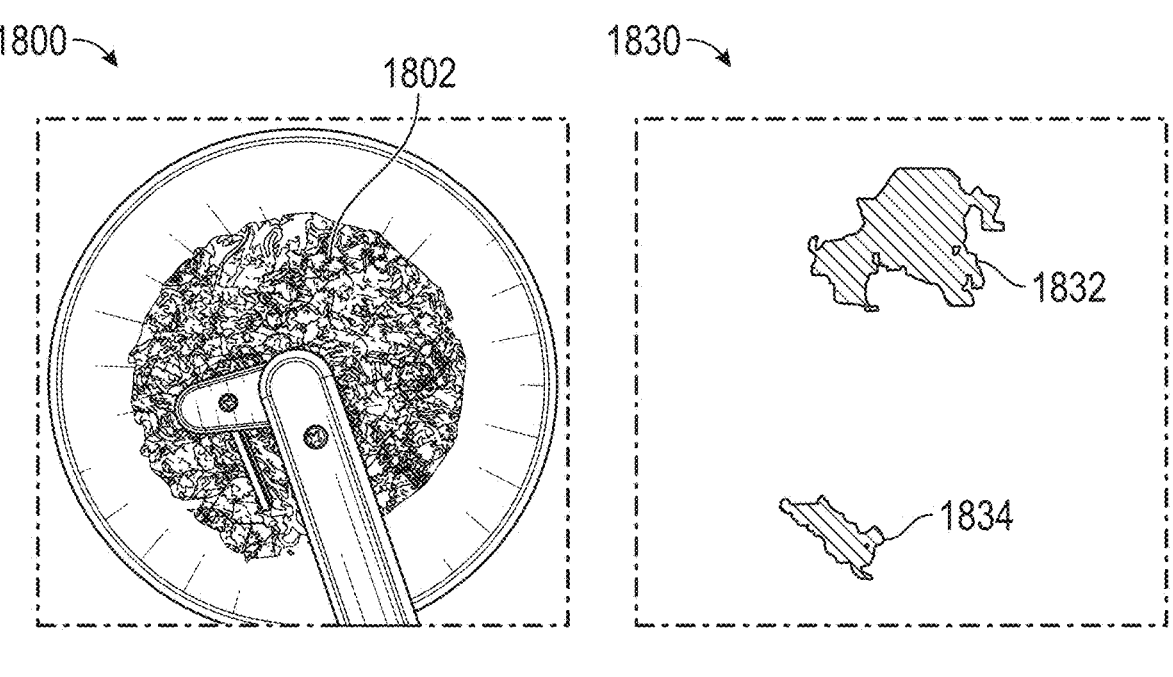
FIG. 18A
FIG. 18B
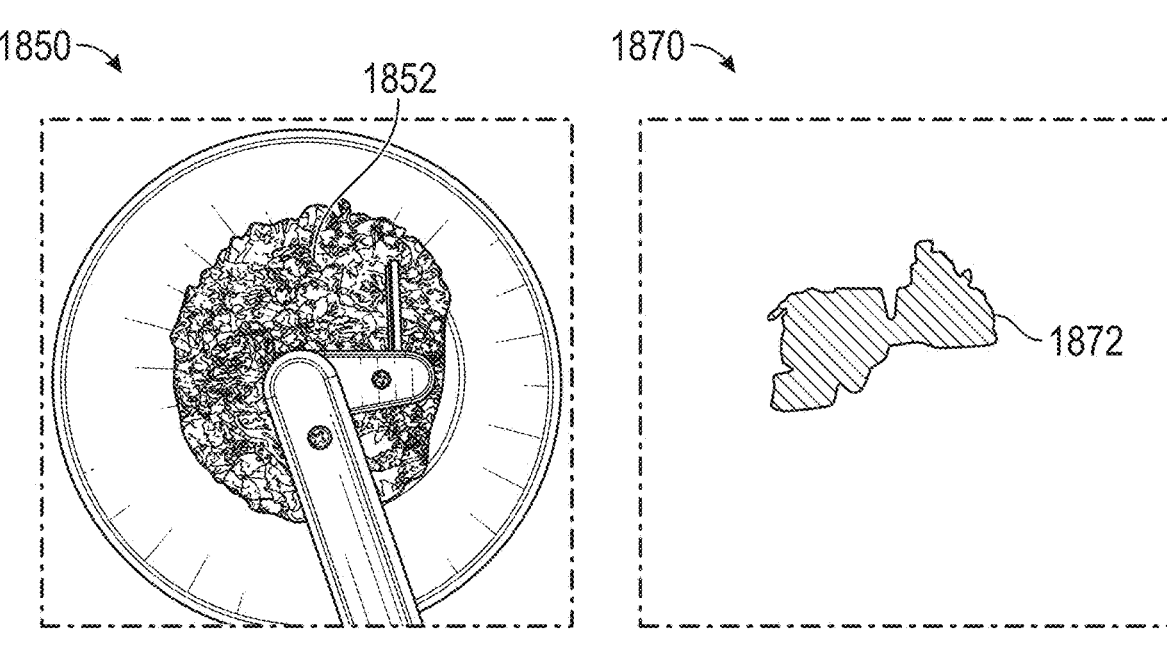
FIG. 18C
FIG. 18D

1900

1905 1910 1915 1920

1916 1921

1925 1930 1931 1935 1936 1940 1941 1945 1946

1950 1955 1960 1965 1967 1970

1966 1971

1980
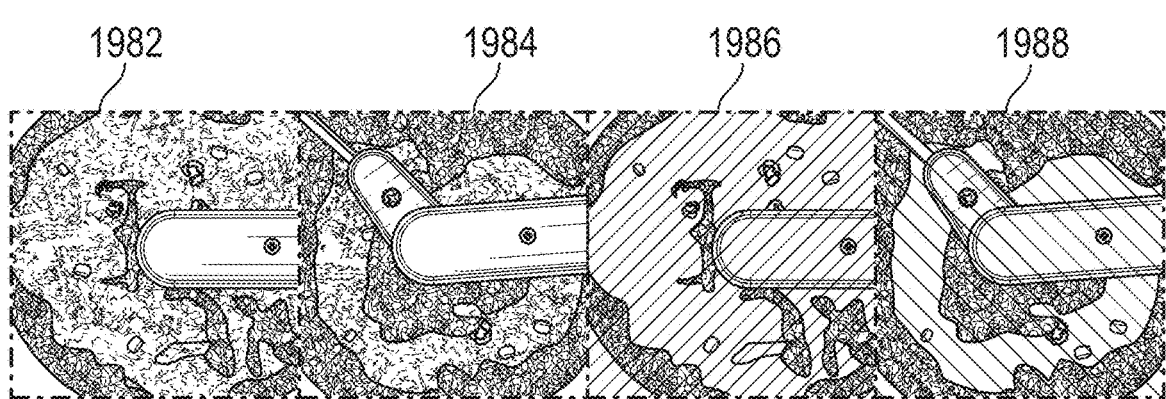
1982      1984      1986      1988
FIG. 19D
1990
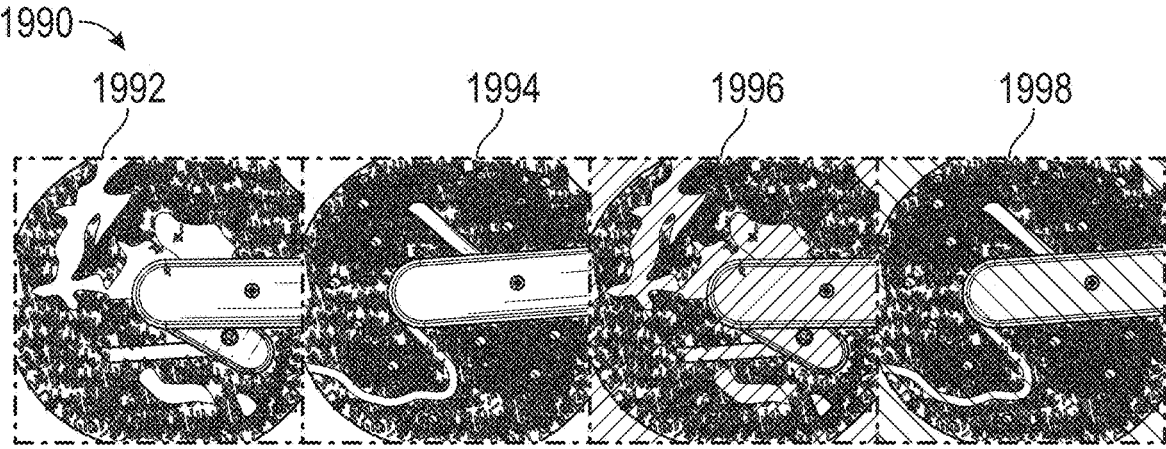
1992      1994      1996      1998
FIG. 19E

2000

Ingredient Similarity : 0.88                                  2002

FINE DICE-Red Onion mapped to class red onion recognized by model

WHOLE-Ginger-Garlic Paste mapped to class red onion paste recognized by model

WHOLE-Green Peas mapped to class green pea recognized by model

SMALL DICE-Orange Carrot mapped to class carrot recognized by model

WASHED AND SOAKED-Basmati Rice mapped to class rice recognized by model

SOAKED-Moong Dal mapped to class moong dal recognized by model

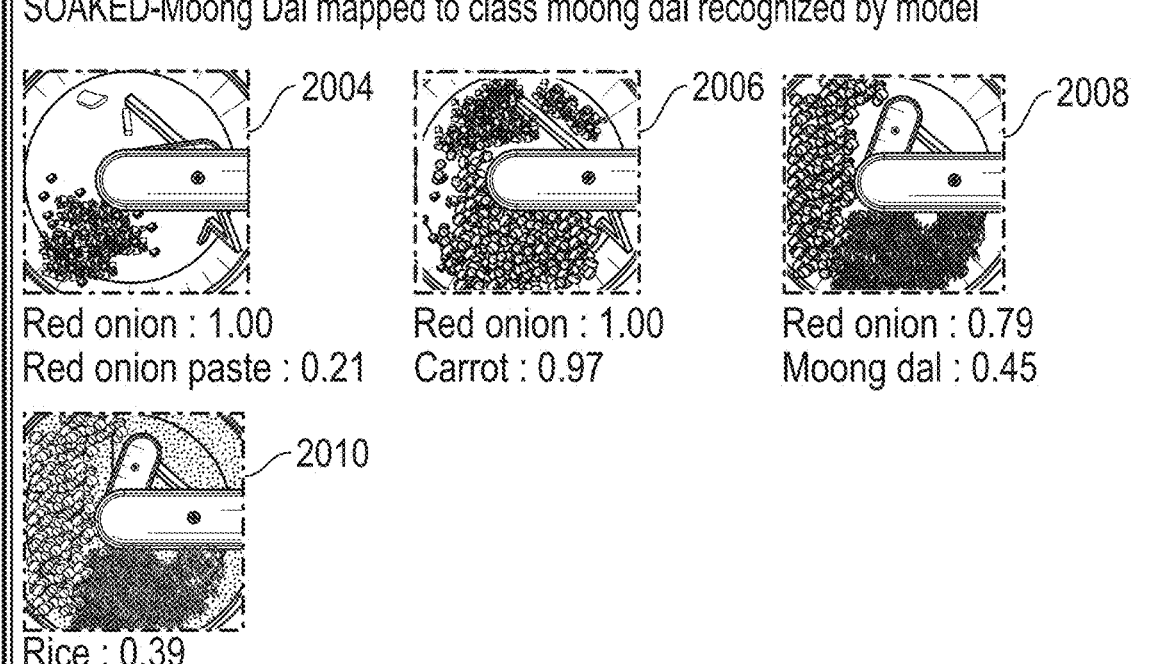

2004

2006

2008

Red onion : 1.00
Red onion paste : 0.21

Red onion : 1.00
Carrot : 0.97

Red onion : 0.79
Moong dal : 0.45

2010

Rice : 0.39

FIG. 20

COUNTERTOP COOKING ROBOT

RELATED APPLICATIONS

This application claims priority to U.S. Provisional Patent Application Ser. No. 63/615,467, entitled Countertop Cooking Robot, filed on Dec. 28, 2023, which is incorporated by reference in its entirety.

TECHNICAL FIELD

This disclosure relates to methods and devices providing a countertop cooking robot that cooks meals automatically.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Appliances for food processing have made numerous advances in recent years. However, fully automated meal preparation appliances have not been developed. Thus, a new solution is needed to provide a fully automated meal preparation appliance able to prepare multiple different recipes and adapt over time.

SUMMARY

Embodiments according to the present disclosure provide a countertop cooking appliance that uses machine learning models to automatically prepare a plurality of different meals. The appliance includes a macro ingredient delivery system for larger ingredients and a micro dispensing system containing a plurality of pods having granular contents. The micro dispensing system may also include a rotation element and a pod rotation mechanism. The pod rotation mechanism moves a selected pod into a position above a pan to dispense the granular contents (such as spices, or seasonings used in each recipe). Each pod may include a dispensing section and a storage section. The rotation element rotates the selected pod to dispense an amount of granular content from the dispensing section with each rotation of the selected pod by the rotation element.

The appliance may also include a stirrer that uses at least one spatula to gradually contact substantially an entire area of at least one surface of the pan after the stirrer completes a rotation cycle. Cooking of the food is also performed using a heating element located underneath the pan and a plurality of sensors oriented around the pan. Control circuitry coupled to each of the macro ingredient delivery system, the micro dispensing system, the stirrer, the heating element, and the plurality of sensors performs recipe methods by regulating amounts of ingredients inserted into the pan using the ingredient delivery system, regulating amounts of at least one granular content using the micro dispensing system, and monitoring and regulating operation of the stirrer and heating element using data from the plurality of sensors. The regulating amounts of the at least one granular content may be performed by providing instructions to the micro dispensing system to perform a number of rotations via the rotation element of the at least one granular content.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 11 is an operational flow diagram illustrating a method of executing a recipe automatically using a plurality of trained machine learning models in conjunction with the countertop cooking appliance, in an embodiment.

FIGS. 18A-18D illustrate showing pairs of images and their segmentation masks generated by a noodle lump detection model, in an embodiment.

FIGS. 19A-19E illustrates comparison images from a recipe similarity report for multiple steps of a recipe, in an embodiment.

FIG. 20 depicts an exemplary screenshot from a recipe similarity report.

DETAILED DESCRIPTION

Although the following detailed description contains many specific details for the purposes of illustration, anyone of ordinary skill in the art will appreciate that many variations and alterations to the following details are within the scope of the invention. Accordingly, the aspects of the disclosure described below are set forth without any loss of generality to, and without imposing limitations upon, the claimed invention.

In the following detailed description, reference is made to the accompanying drawings, which form a part hereof, and in which is shown by way of illustration specific embodiments in which the invention may be practiced. In this regard, directional terminology, such as "top," "bottom," "front," "back," "first," "second," etc., is used with reference to the orientation of the figure(s) being described. Because components of embodiments of the present invention can be positioned in many different orientations, the directional terminology is used for purposes of illustration and is in no way limiting. It is to be understood that other embodiments may be utilized, and structural or logical changes may be made without departing from the scope of the present invention. The following detailed description, therefore, is not to be taken in a limiting sense, and the scope of the present invention is defined by the appended claims.

Figure 1:
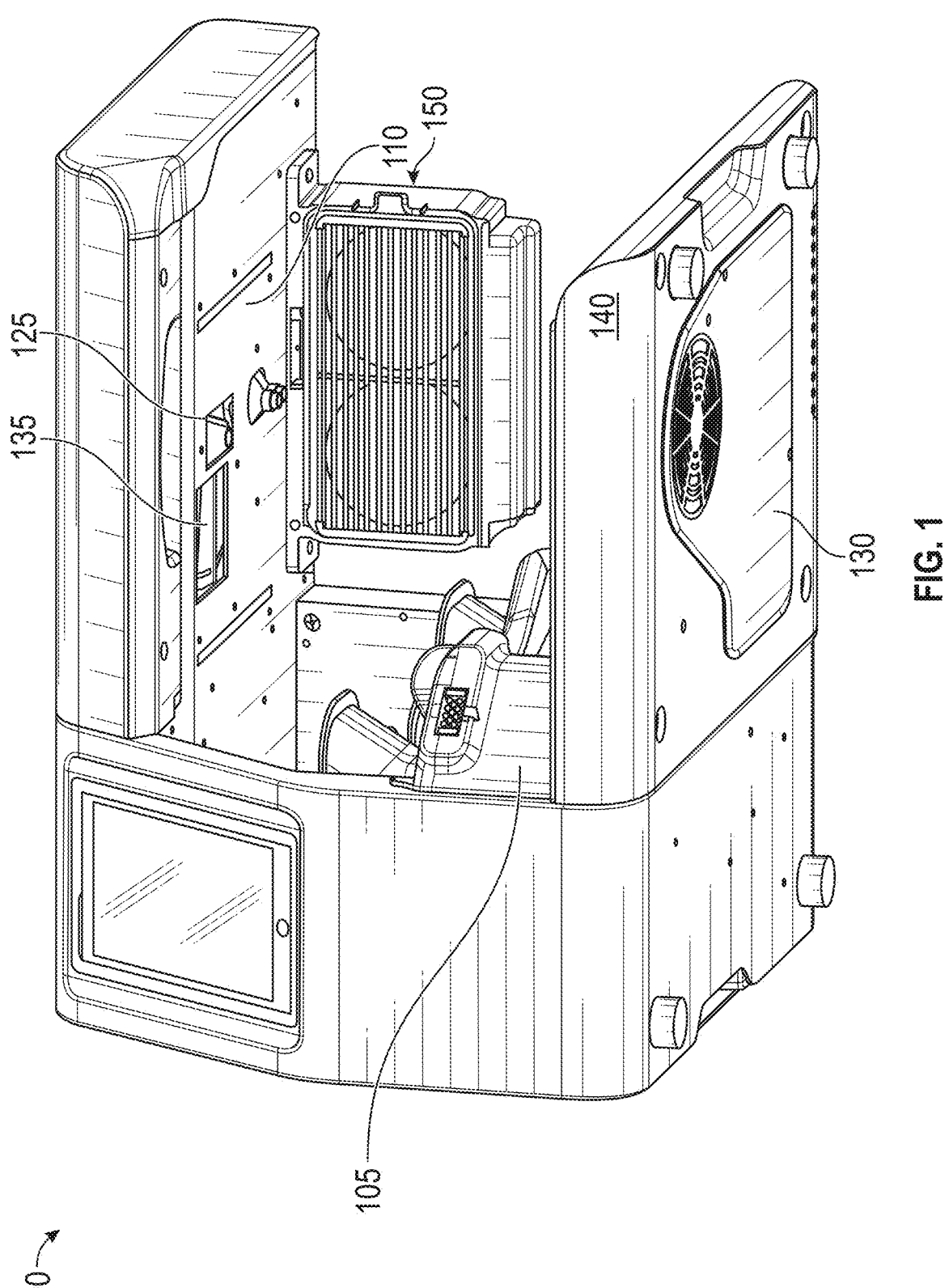
FIG. 1 illustrates a countertop cooking appliance that uses machine learning models to automatically prepare a plurality of different meals, in an embodiment.

To provide a fully automated meal preparation appliance, the specially adapted hardware is used in conjunction with a plurality of machine learning modules to execute each recipe. The hardware will be discussed first. FIG. 1 illustrates a countertop cooking appliance 100 that uses machine learning models to automatically prepare a plurality of different meals, in an embodiment. The appliance 100 includes a macro ingredient delivery system 105 for larger ingredients and a micro dispensing system 110 containing a plurality of pods having granular contents, which are dispensed through opening 135. (The macro delivery system 105 is described in greater detail in FIGS. 8-9 and the accompanying text; the micro dispensing system 110 is further described in FIGS. 4A-6 and the accompanying text.) The appliance may also include a stirrer (not shown; see FIGS. 2A-3 and accompanying text) that uses at least one spatula attachment to gradually contact substantially an entire area of at least one surface of a pan after the stirrer completes a rotation cycle.

Cooking of the food is also performed using a heating element located underneath the pan in lower panel 140. A plurality of sensors, such as camera 125, oriented around the pan may be used by control circuitry to monitor recipe progress. The control circuitry may be coupled to each of the macro ingredient delivery system 105, the micro dispensing system 110, the stirrer, the heating element, and the plurality of sensors. Recipe methods are executed by the control circuitry by regulating amounts of ingredients inserted into the pan using the macro ingredient delivery system 105, regulating amounts of at least one granular content using the micro dispensing system 110, and monitoring and regulating operation of the stirrer and heating element using data from the plurality of sensors.

Optional elements such as light source 150, which may improve lighting conditions for operation of camera 125, and exhaust system 130 may also be controlled by the control circuitry to improve operation of the appliance 100. The device 100 uses a camera module 125, which is responsible for capturing the images of the cooking pan for the duration of the cooking process. The camera module 125 may be placed right on top of the cooking pan as shown and may be centered over the pan in some embodiments. The camera 125 may have a field of view sufficient enough to capture the complete surface area of the pan, covering the base of the pan as well as the sides of the pan. Capturing the sides of the pan may improve the control circuitry's ability to identify reduction in volume of sauce as the gravy thickens. The camera module 125 may be selected to be a high-resolution camera, to permit the appliance 100 to capture granular details of the food items being cooked, such as the color of the surface of food, or the edges of food items.

To prevent the camera module 125 from being covered by vapor and fumes during the process of cooking a dish, the device 100 also uses an exhaust system 130 (which may also be located on the rear side of the device, in addition to the bottom panel 140 as shown). The exhaust system 130 may be used to create suction for the vapor and fumes generated during the process of cooking and provide an airflow away from the lens of camera 125. Similarly, light source 150 may be used to ensure that the camera 125 is provided with an illuminated view of the food being cooked. In the embodiment shown, the camera 125 is assisted by lighting source 150, which includes two LED strips placed on the same surface as the camera module 125. These LED strips may be used by the control circuitry, along with a diffuser/dimmer, to ensure that the food is illuminated well in conditions where the external lighting is not sufficient and allow the camera 125 to capture all the required details from the pan and the food ingredients.

Figure 2A:
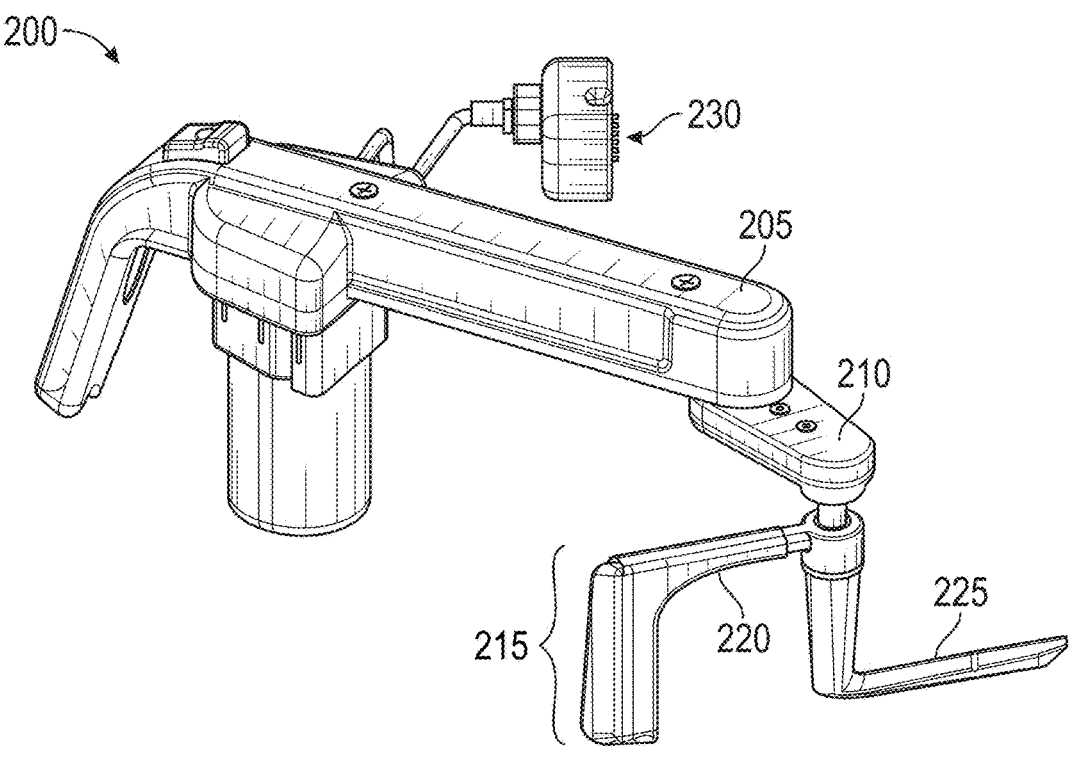
FIGS. 2A-2B illustrate exemplary stirrer sub-systems of the countertop cooking appliance with different spatula connectors attached.
Figure 2B:
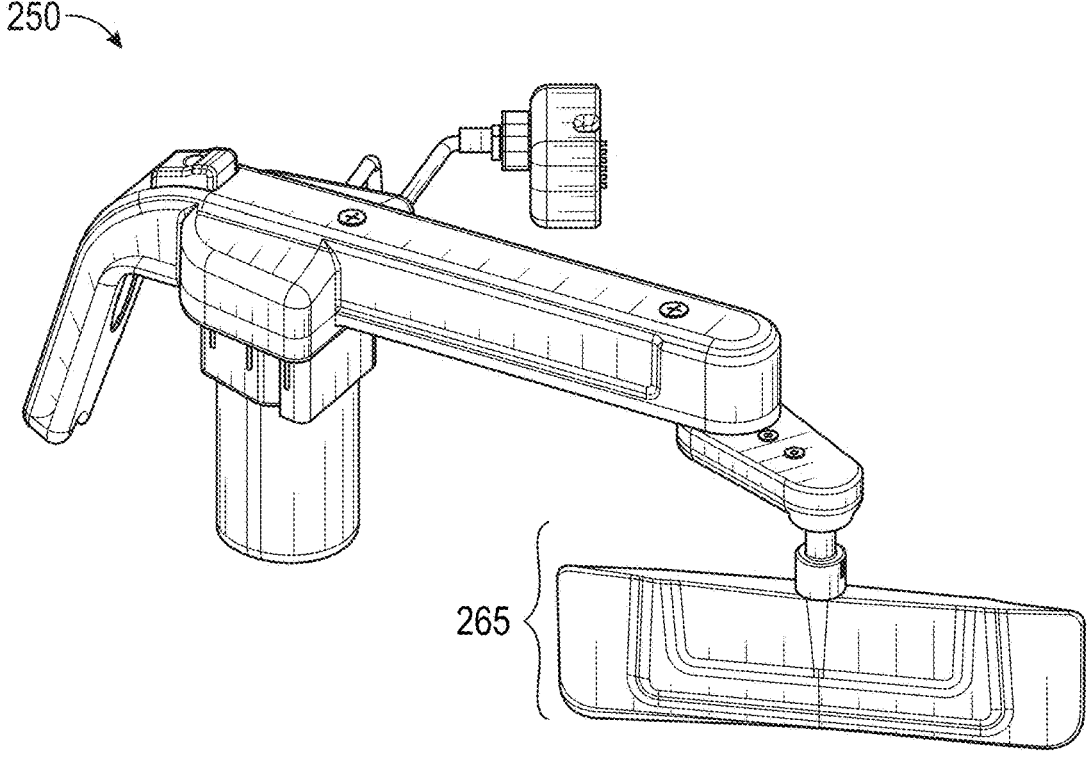

As noted above, the stirrer is used by the control circuitry to directly interact with food within the pan being heated by the appliance 100. FIGS. 2A-B illustrate exemplary stirrer sub-systems of the countertop cooking appliance with different spatula connectors attached. The stirrer of the countertop cooking appliance employs an eccentric stirring mechanism, which causes the stirrer to rotate on an off-center orbital path. This permits the stirrer to access the entire span of the pan, stirring the ingredients without causing bulk motion as a conventional single axis stirrer would. The stirrer may also clear the walls of the pan as it rotates through several cycles.

Exemplary stirring arm system 200 includes connector cable 230 for receiving power and communications from the control circuitry of the countertop cooking appliance. The stirrer itself includes top enclosure 205, which may be a fixed element that houses the drivetrain for the moving parts of the stirrer system 200. Eccentric arm 210 rotates around top enclosure 205 and may include the gears to drive spatulas 215. Internally, the stirrer 200 includes a motor, which may rotate the eccentric arm 210 via a belt and at least two pulleys in an exemplary embodiment. The eccentric arm 210 may house a series of gears (e.g., four gears, though more or fewer gears may be used) which amplify the rotating motion of the eccentric arm 210 and drive rotation of the spatula shaft.

Spatulas 215 may rotate around the spatula shaft attached to eccentric arm 210 and include removable spatula attachments 220 and 225. FIG. 2B shows a stirrer system 25 with an alternative spatula attachment 265 attached to eccentric arm 210. As shown in FIGS. 2A-B, the spatula may be a modular attachment to the stirrer, allowing the user to replace the spatula as per the requirement of the recipe being prepared by the automated cooking appliance. As per the above image, spatula attachments 220 and 225 can be used as a combination, or can be used separately if desired. The combination 215 of spatula attachments 220 and 225 may be used to achieve constant motion of the food ingredients, as well as the tossing and turning of food ingredients, by attaining full coverage of the inner pan surface, regardless of the amount of ingredients inside the pan. For example, when the cooking appliance has automatically inserted oil, cornflour, and medium sized boneless chicken pieces into the pan, the spatula combination 215 may ensure that the chicken is coated with cornflour on all sides and cooked evenly, rather than being covered and cooked from the bottom surface of chicken only. This is achieved by the tapered profile of the bottom spatula 225, which slides under the food ingredient, and then topples the food ingredient as it rises up on the spatula 225.

Figure 3:
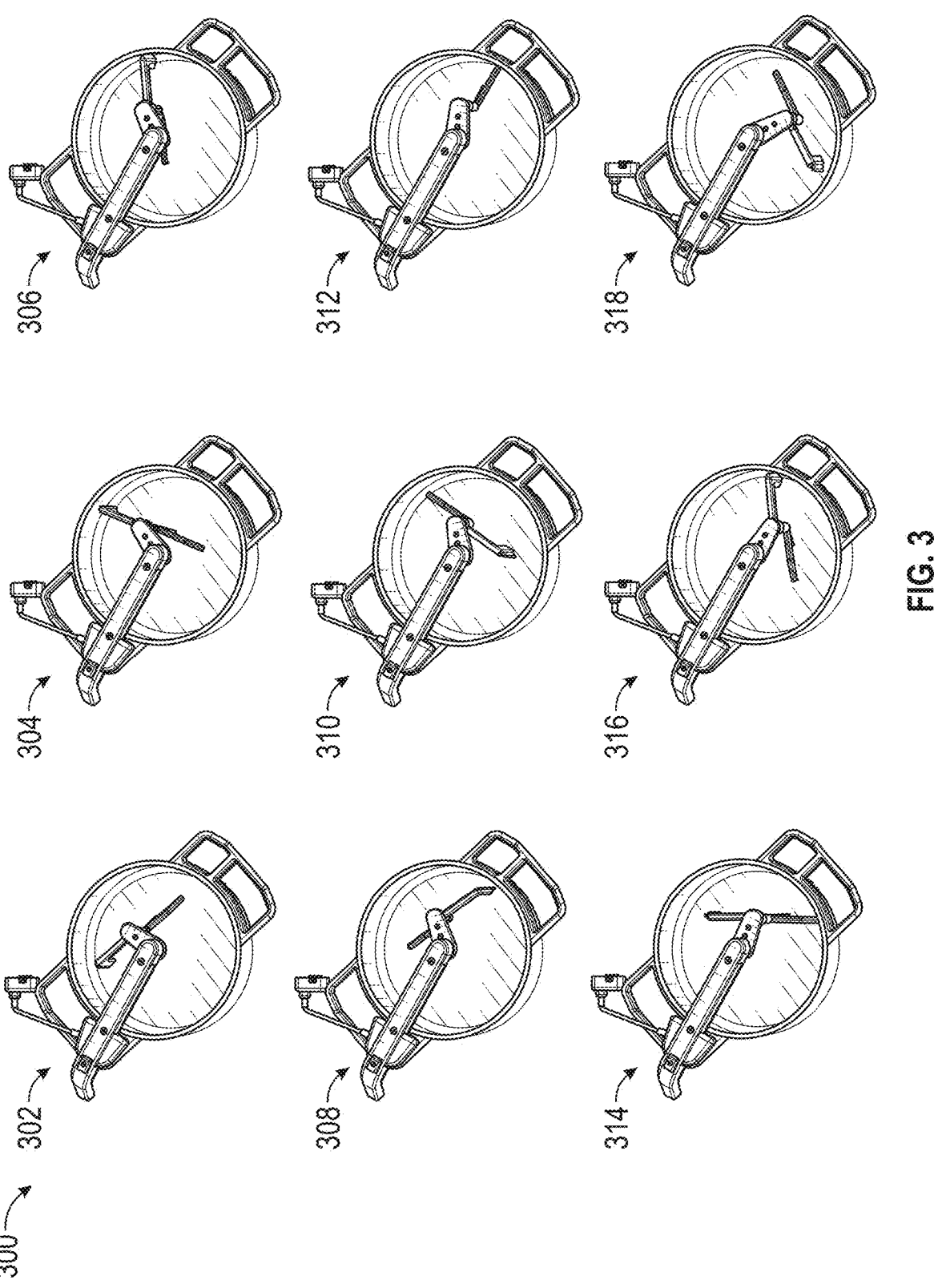
FIG. 3 depicts a sequence of images showing an exemplary rotation path of the stirrer arm of the stirrer sub-system.

The design of the stirrer systems 200 and 250 uses the eccentric arm 210 to move spatula 215 (or 265) in an eccentric motion across the pan. FIG. 3 depicts a sequence of images 300 showing an exemplary partial rotation path of the stirrer of stirrer sub-system 200. The eccentric motion of the spatula ensures that the bottom spatula 225 is rotating in smaller circles in a section of the pan at a time. This gradually causes scraping of the bottom surface of the pan, starting at step 302, and proceeding to 304, then 306, 308, 310, 312, 314, 316, and finally at step 318 nearly covering half the bottom surface of the pan. This allows the stirrer 200 to move food in smaller circles within the pan, rather than just moving food around the outer diameter of the bottom surface of the pan. The eccentric motion of the spatula 215 also ensures that the side spatula 220 is regularly scraping small parts of the side wall. The side spatula 220 is able in the embodiment shown in FIG. 3 to scrape the entire inner side wall section of the pan within 21 rotation of the eccentric arm 210.

Figures 4A, 4B:
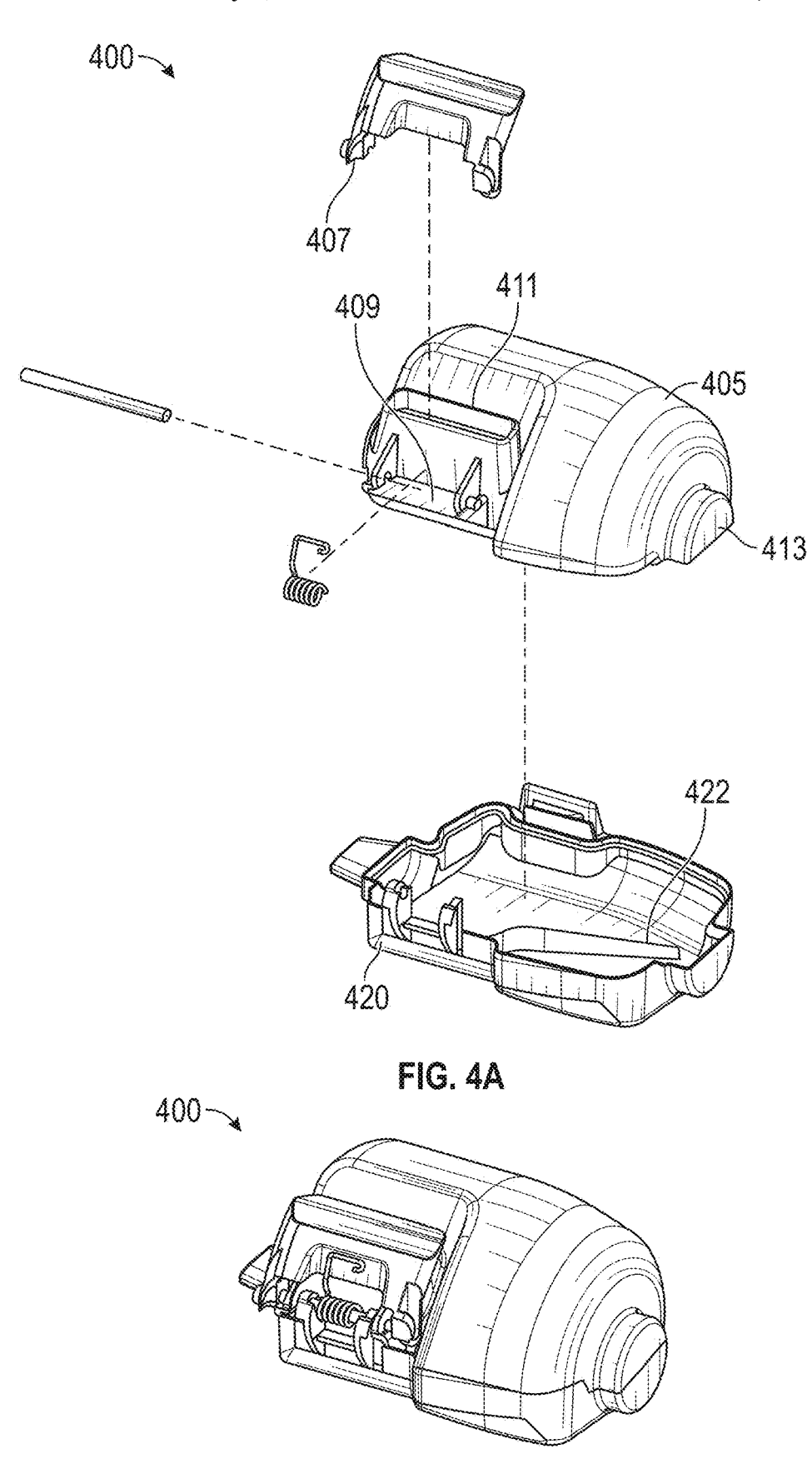
FIGS. 4A and 4B illustrate an exploded view and a side view respectively of a pod of the micro dispensing system of the countertop cooking appliance.

Moving to the micro dispensing system, FIGS. 4A and 4B illustrate an exploded view and a side view respectively of a pod 450 of the micro dispensing system of the countertop cooking appliance, used to dispense seasonings or any powdered ingredient used in a recipe. Pods such as pod 450 are rotated to dispense fixed, repeatable amounts of granular contents. Pod 450 allows several different granularities of contents to be dispensed from the same design. Pod 450 may be designed to dispense its full capacity of granular contents, with little matter left over at the end. The fact that the pod is enclosed protects the contents from the external environment when not being dispensed, even as the micro dispensing system itself is enclosed (as seen in appliance 100 in FIG. 1). Pods are removable, refillable, and replaceable in the dispensing setup, with a simple drop in motion to install in some embodiments.

Each pod may include a dispensing section (e.g., spout 411) and a storage section bounded by top enclosure 405 and bottom enclosure 420. Pod 400 also includes hatch 409, which opens to dispense granular contents, a shaft for the hatch to pivot around, and a spring which keeps the hatch closed during rotation. The rotation element rotates the selected pod 400 to dispense an amount of granular content from the dispensing section 411 with each rotation of the selected pod by the rotation element. The amount of granular content may be regulated by the control circuitry providing instructions to the micro dispensing system to perform a number of rotations via the rotation element of the selected granular content.

The pod 400 is designed to isolate a fixed amount of matter for dispensing during every rotation. Once this volume has been isolated in dispensing section 411, it is dispensed as the pod 400 continues its rotation. The collection and dispensing occur on the same continuous rotation cycle. The pod hatch 409 may include a protrusion that is acted on by a stationary feature of the micro dispensing system, which pushes the hatch 409 open as the pod 400 rotates. The pod then shuts as the rotation continues. The position of the stationary actuation feature may be such that a certain, fixed amount of matter is collected in the dispensing region 411 of the pod 400 before the hatch 409 is opened. Once opened, the granular content falls down into the pan by the force of gravity. For larger amounts, the pod 400 repeats the rotation cycles until the desired total amount is achieved. As the pod 400 empties itself over the course of several cycles, less and less granular content is present in the pod. In order to move this matter to the dispense region 411, a wall 422 is present on the internal surface of the bottom enclosure 420, which funnels matter into the dispensing region 411 as the pod 400 rotates.

Figure 5:
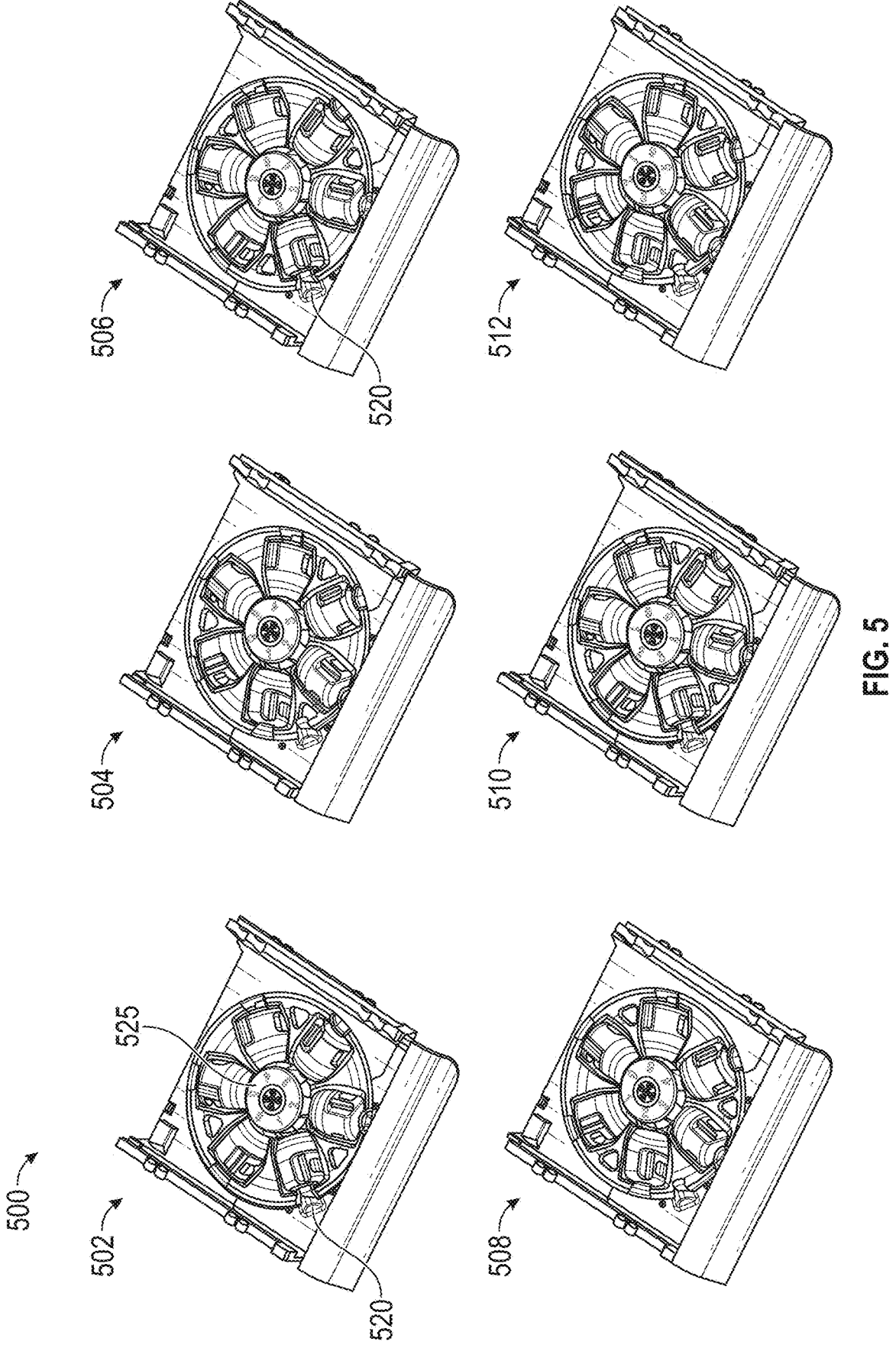
FIG. 5 depicts a sequence of images showing exemplary motion of the carousel, containing a plurality of pods, of the micro dispensing system of the countertop cooking appliance, in an embodiment.

Each of the pods 400 is placed on a rotation element, such as a carousel, of the micro dispensing system. The carousel rotates the pods on a central axis to the dispensing location, where the pods are then individually rotated on their own axis to dispense via a pod rotation mechanism. A photoelectric (PE) sensor in communication with the control circuitry may be used to detect whether the pod 400 is at the right location before dispensing. FIG. 5 depicts a sequence of images 500 showing exemplary motion of the exemplary rotation element, containing a plurality of pods, of the micro dispensing system of the countertop cooking appliance, in an embodiment. A single dispensing station 520 is used to dispense from a number of pods. As shown, the carousel system 525 embodiment of the rotation element seats six pods, but more or fewer pods may be accommodated by the rotation element in different embodiments. The pods themselves are designed to be dropped in vertically into the carousel 525. The carousel 525 is centrally rotated by its own servo, allowing each of the pods to be individually positioned in line with the coupler of the dispense station 520 for dispensing. The PE sensor reads from a feature on the carousel, allowing it to be accurately positioned, such that the pods are in line with the coupler for dispensing the granular contents. The sequence of images shows the pod labeled "1" in position in the dispense station 520 in image 502. Image 504 shows the carousel 525 gradually moving to the position in image 506, where pod "2" is in position in the dispense station 520. The rotation behavior is repeated in a clockwise direction in images 508 and 510, which shows pod "3" in position in the dispense station 520. The sequence ends in image 512, with the carousel 525 moving the pod "4" towards the dispense station 520.

Figure 6:
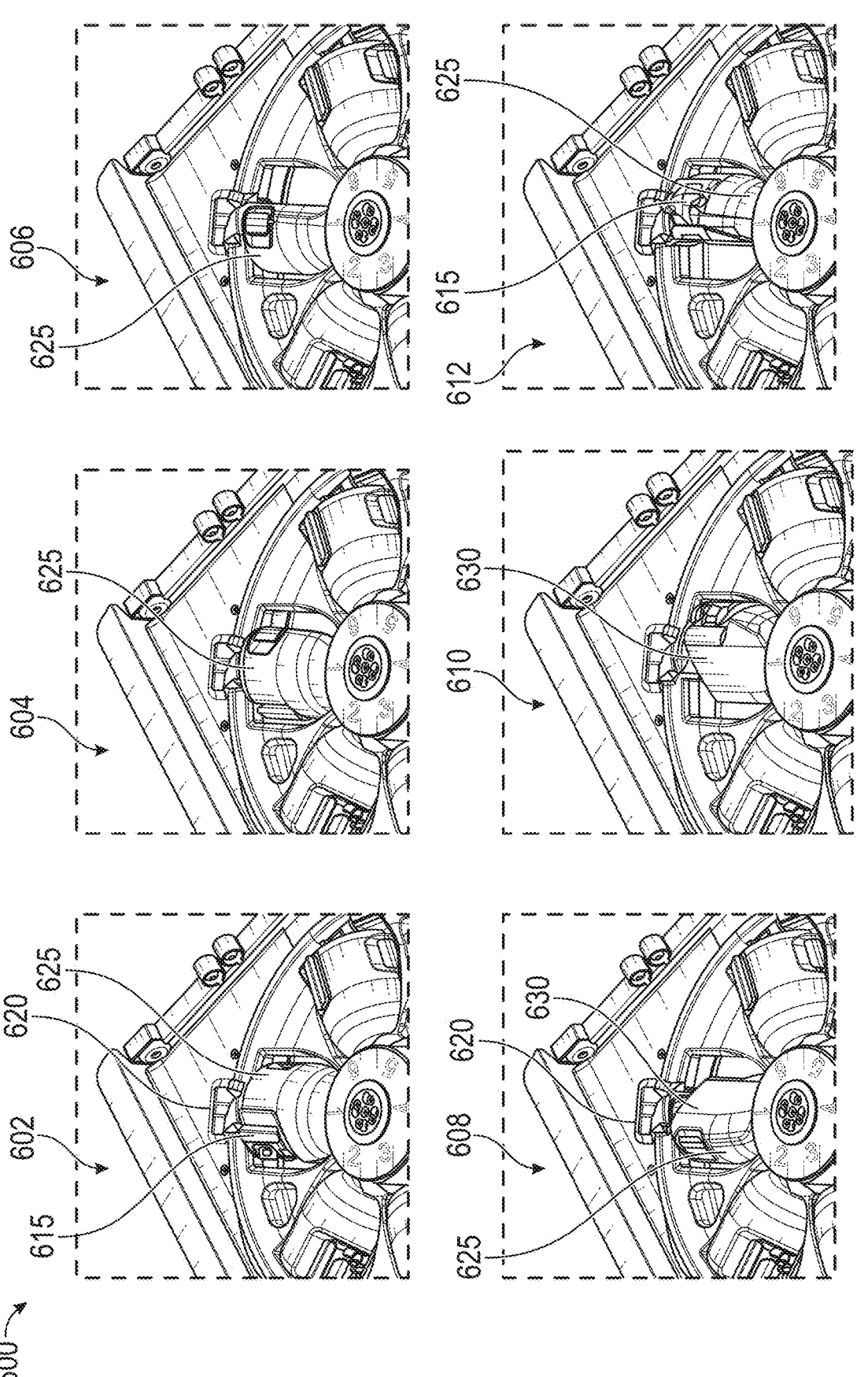
FIG. 6 depicts a sequence of images showing exemplary dispensing rotation of a pod of the micro dispensing system, in an embodiment.

FIG. 6 likewise depicts a sequence of images 600 showing an exemplary pod rotation mechanism 620 of the micro dispensing system, in an embodiment. In order to dispense, the pod 625 may be rotated on its longitudinal axis by a servo motor acting through a coupler of the pod rotation mechanism 620. This coupler rotates the pod 625, whilst allowing the pod 625 to transversely enter and exit the dispensing station using the carousel. Images 600 illustrate various stages of the pod rotation and granular content dispensation processes. In image 602, the top enclosure of the pod, including the hatch 615, is visible from a top view. Images 604 and 606 show gradual rotation of the pod 625 so the hatch 615 will eventually be located above the pan. By image 608, the bottom enclosure 630 of the pod 625 is visible from the top view and the pod 625 is almost in position to dispense. Image 610 shows the pod 625 during dispensation, where the stationary feature of the rotation mechanism 620 is opening the hatch 615 and granular contents from the dispense section 411 are being emptied into the pot. Image 612 shows the pod 625 after a first rotation and dispensation, with the hatch 615 again being visible from a top view of the dispensation system.

Figure 7:
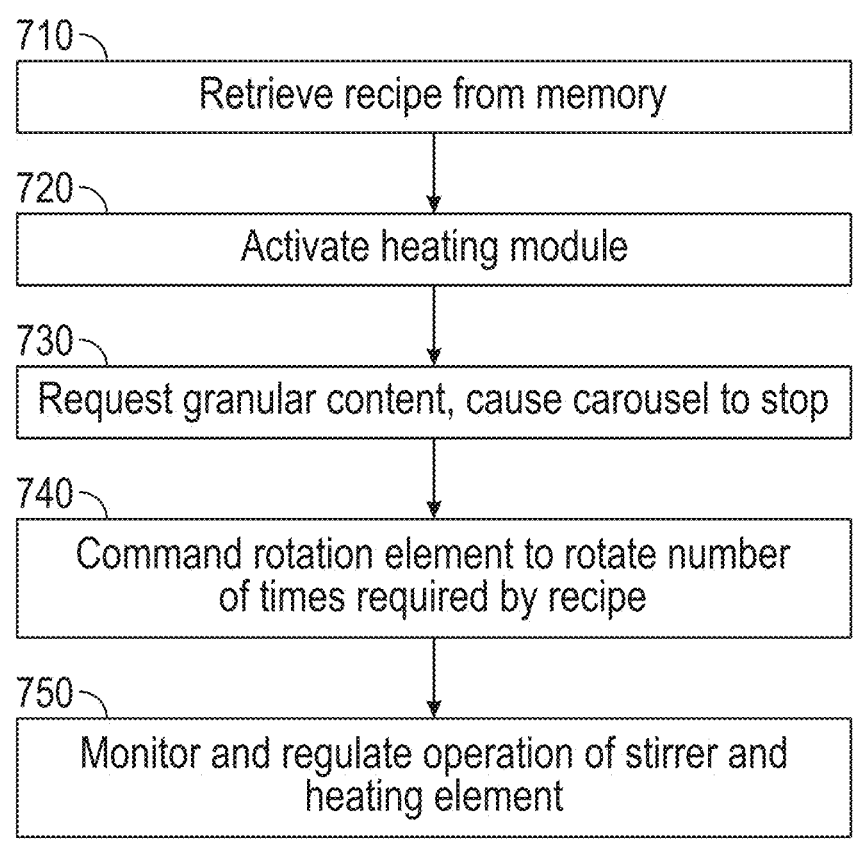
FIG. 7 is an operational flow diagram illustrating a method of dispensing granular material as part of a recipe executed by the countertop cooking appliance, in an embodiment.

FIG. 7 is an operational flow diagram illustrating a method 700 of dispensing granular material as part of a recipe executed by the countertop cooking appliance, in an embodiment. Method 700 summarizes the steps described above, with a recipe being retrieved from memory by the control circuitry at step 710. At step 720, the heating module may be activated, along with addition of macro ingredients and/or stirring by the stirrer. At step 730, selected granular contents may be specified by the recipe, causing the carousel to rotate and stop at the pod corresponding to the selected granular contents. At step 740 the control circuitry sends a command to the rotation element at the dispense station to rotate the number of times required to dispense the amount of granular contents specified by the recipe. After dispensation of the selected granular contents, at step 750 execution of the recipe continues, as the control circuitry monitors and regulates operation of the stirrer and heating element. This regulation is detailed in further detail below.

Figure 8:
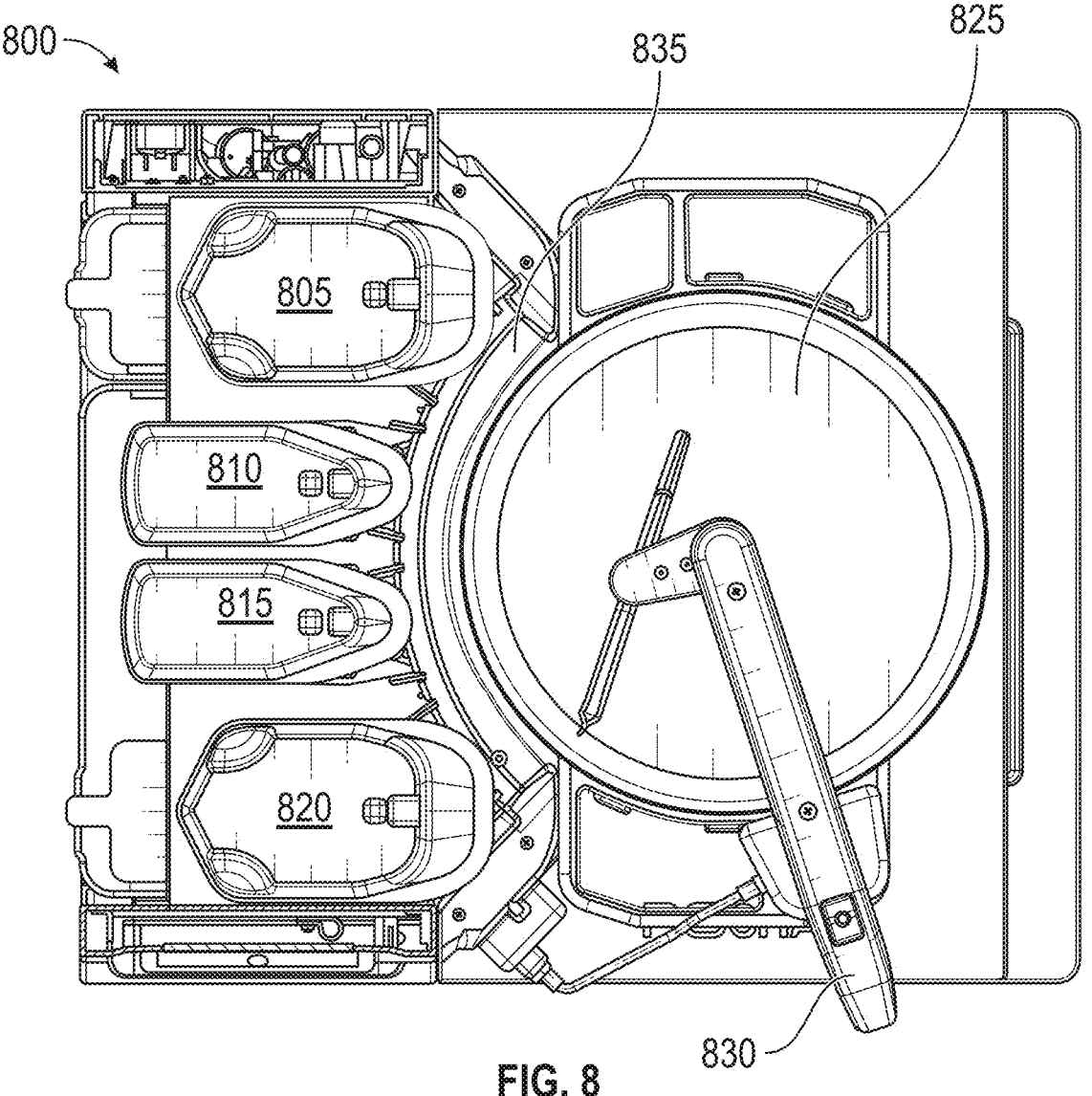
FIG. 8 illustrates a top cross-section view of the countertop cooking appliance, in an embodiment.
Figure 9:
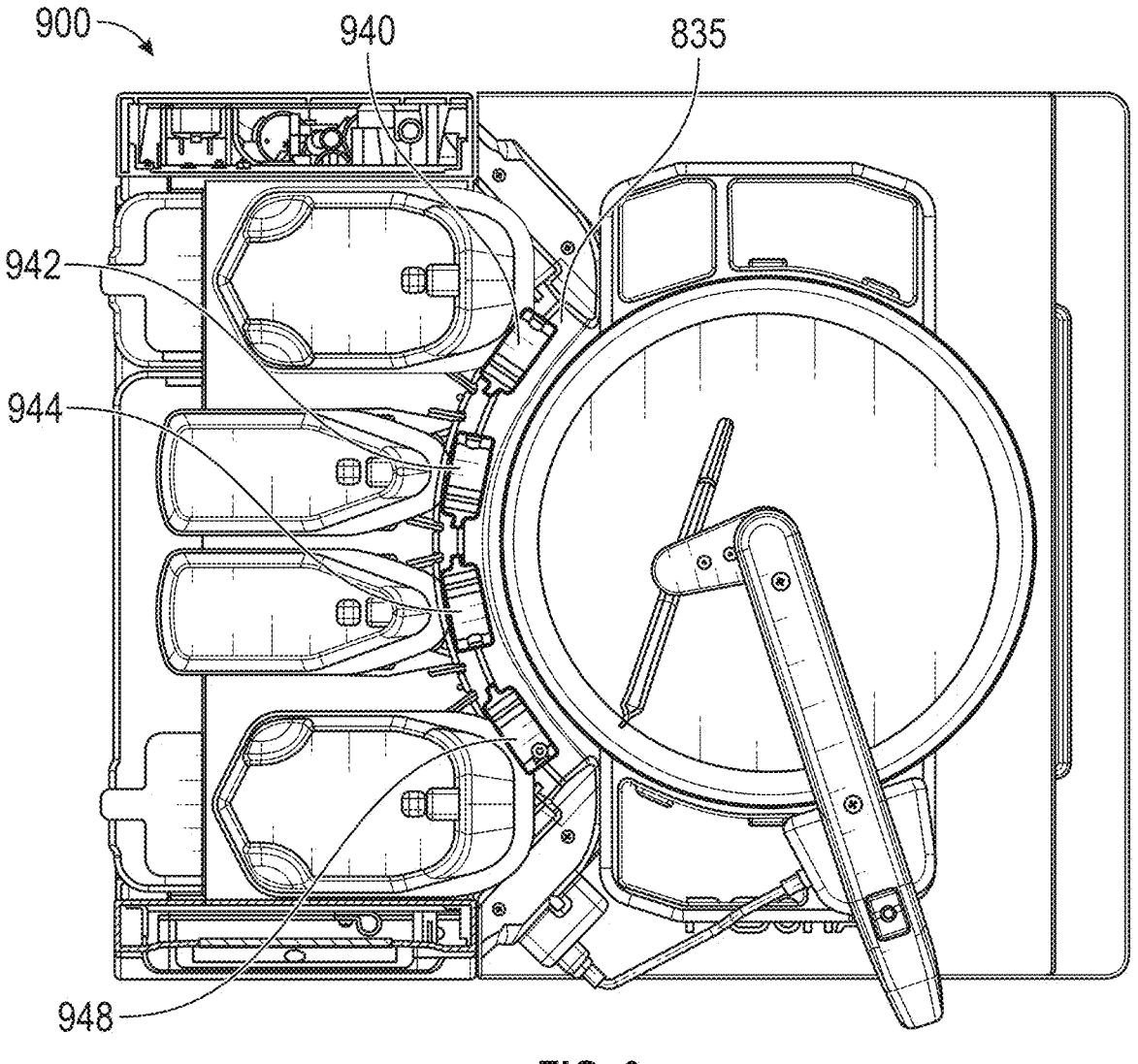
FIG. 9 illustrates a different top cross-section view of the countertop cooking appliance, in an embodiment.

As noted above, the recipes generally require insertion of one or more macro ingredients via the macro ingredient system (e.g., at step 720 of method 700). FIG. 8 illustrates a top cross-section view 800 of the countertop cooking appliance, in an embodiment. As shown, the macro ingredient system includes four containers 805, 810, 815, and 820 arranged around pan 825, with the containers sliding in parallel from the same side of the pan 825. Motors for each container are arrayed in a circular manner around a section of the pan and may be located under pan enclosure 835. In an embodiment, FIG. 9 illustrates a different top cross-section view 900 of the countertop cooking appliance showing individual motors 942, 944, 946, and 948 within pan enclosure 835. In an exemplary embodiment, the motors may be single servo motors having direct drive. The axis of the containers may be offset from the servo action axis to lift the containers slightly off their own axes. Up to 155 degrees of rotation may be possible from each container in an embodiment, allowing tipping of all macro ingredients into the pan 825.

As shown, each motor may have an individual enclosure having a common design and can be assembled in any of the 4 locations around the pan proximate to the corresponding containers. Pan enclosure 835 is designed to reduce parting lines between parts, as this is the pan-facing side and is likely to get more dirty. The pan enclosure 835 allows the single enclosures of the motors to be screwed into it at differing angles despite it being a single action molded part. In an exemplary embodiment, each container 805, 810, 815, and 820 may be slid in to dock the container to the lifter of the motors. Each lifter may have a stationary feature to give tactile feedback as the container is slid in (e.g., a ball spring).

Figure 10A:
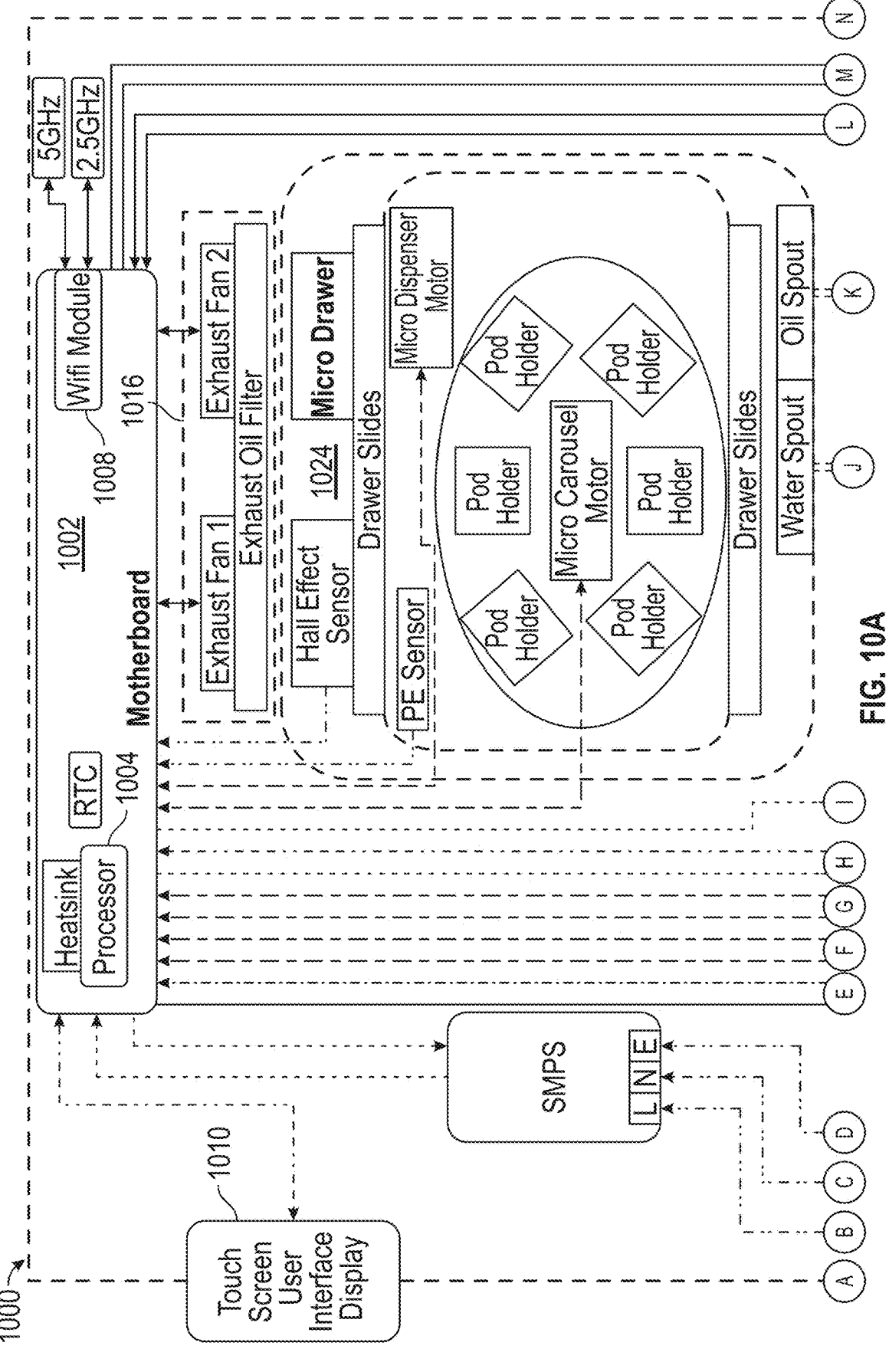
FIGS. 10A-10B illustrate a system block diagram of the countertop cooking appliance, in an embodiment.
Figure 10B:
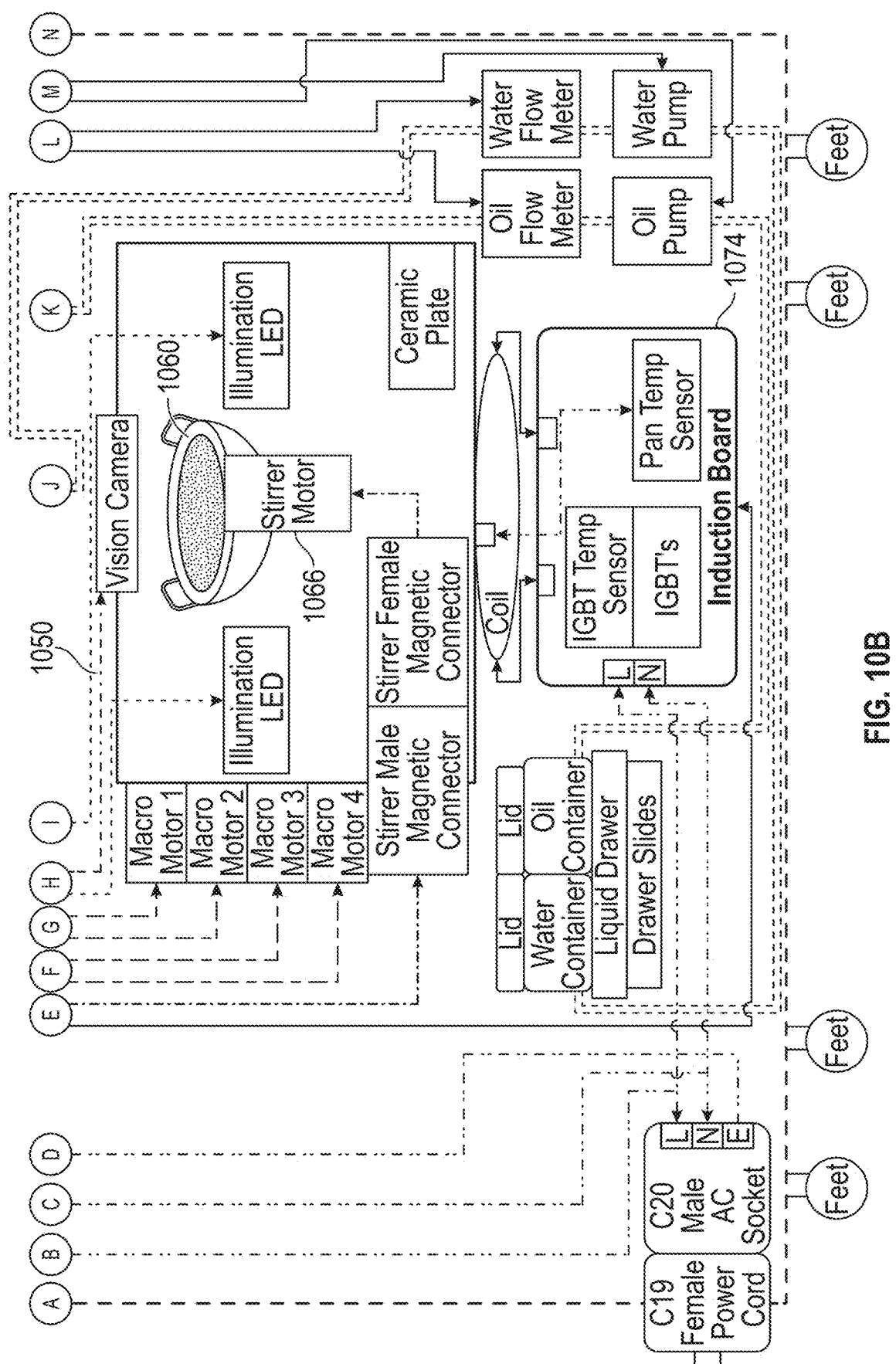

FIGS. 10A-B illustrate a detailed system block diagram 1000 of the countertop cooking appliance, in an embodiment. System 1000 provides a more comprehensive display of how the components of the appliance are connected and coupled to each other, including communications between the exemplary control circuitry (e.g., motherboard 1002) to other components. Motherboard 1002 includes the control circuitry for managing all other components and for executing recipes. Motherboard 1002 includes processor 1004 and WiFi module 1008 for communicating with the cloud server. Touchscreen 1010 may be used by users to select recipes and provides an interface to display information, including report information after execution of a recipe, as discussed below. For execution of recipes in pan 1060, the motherboard 1002 communicates with vision camera 1050, stirrer 1066, and induction board 1074 to control heating of the pan 1060. Dispensation of granular contents may be performed using micro drawer box 1024, including all sub-components of the micro ingredient dispensation system discussed above. Additionally, to macro and micro ingredients, a liquid dispensing sub-system may be used for dispensing Water and oil into the cooking pan 1060. Performance of camera 1050 may be improved by motherboard 1002 communicating with exhaust system 1016, as described above.

Figure 12:
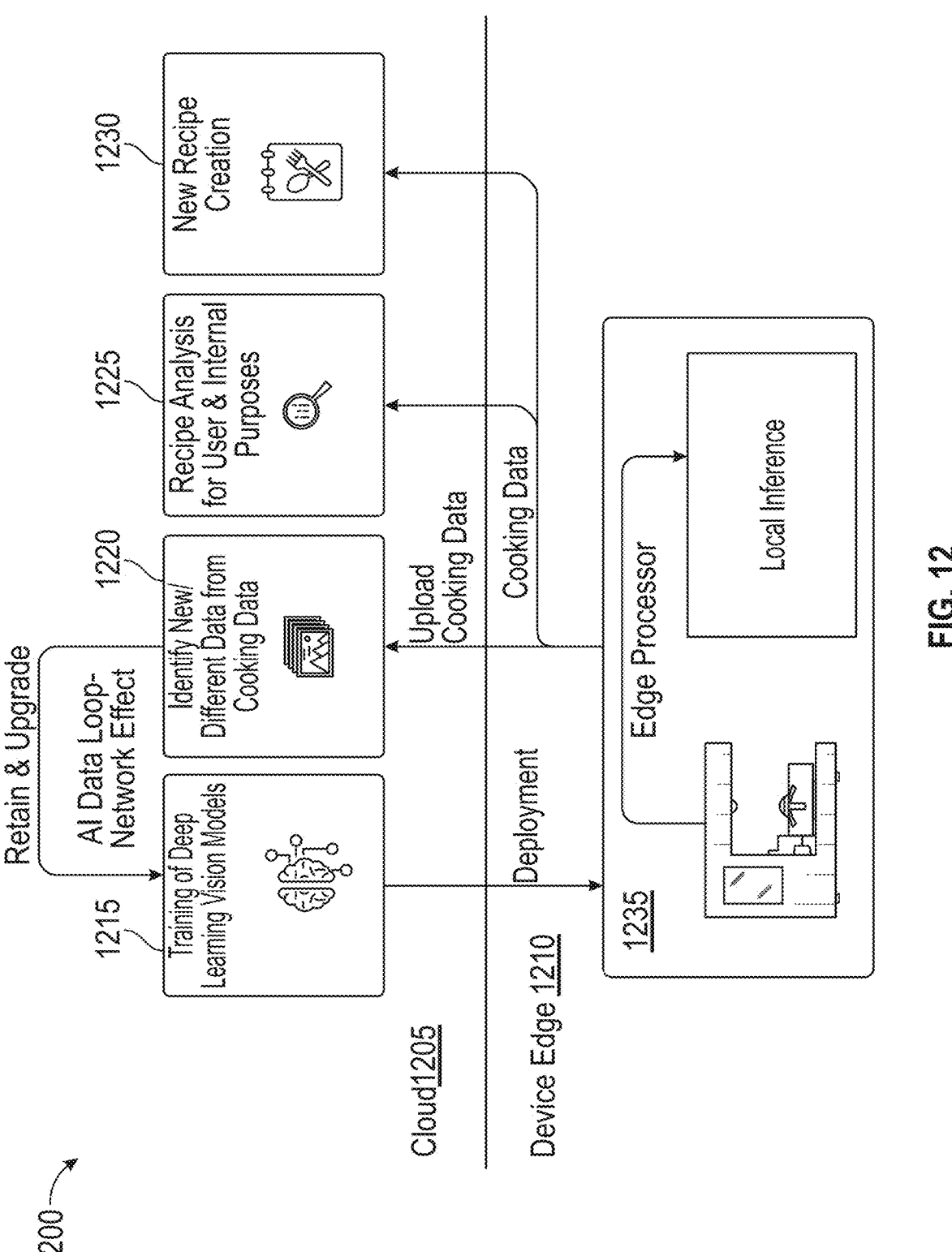
FIG. 12 depicts a block diagram illustrating a data flow between a cloud-based server and a countertop cooking appliance, in an embodiment.

FIG. 11 is an operational flow diagram illustrating a method 1100 of executing a recipe automatically using a plurality of trained machine learning models in conjunction with the countertop cooking appliance, in an embodiment. At step 1110, the control circuitry receives instructions to execute a recipe (e.g., from a user interface, such as touchscreen 1010). The recipe may be initially received from a cloud-based server, as shown in FIG. 12, and stored in local memory on the cooking appliance. At step 1120, a first ingredient may be requested from the macro ingredient dispenser system. After the first ingredient is deposited into the pan, the control circuitry may provide the desired settings from the recipe to the heating element and the stirring element at step 1130. Using the camera, the contents of the pan may then be continuously monitored, and periodically, an image from the camera may be compared to the golden image for the first ingredient using a trained segmentation model at step 1135 for purposes of generating a report of the entire recipe. The results of the comparison may be logged.

At the same time, the image from the camera may be compared to a target state image using a trained preparation stage model at step 1140 to determine if the step has been completed. Once a threshold similarity has been reached, at step 1150 the next step of the recipe is started. Finally, at step 1160 the ingredient steps 1120-1150 may be repeated for the next ingredient of the recipe, and so forth, until the recipe has been completed.

FIG. 12 depicts a block diagram illustrating a data flow between a cloud-based server 1205 and the countertop cooking appliance 1210, in an embodiment. The computer vision models deployed locally on the device 1210 have been trained on the cloud servers 1205 at block 1215. The dataset used to initially train these models has been generated and annotated to improve tailoring of the computer vision models to the capabilities and limitations of the appliance 1210. The performance of the computer vision models may be continuously improved via communication between the cloud servers 1205 and the device 1210. All devices in the field 1235 may submit data to the cloud server 1205 to improve performance. At block 1220a separate performance model is used to analyze image data generated during preparation of recipes to figure out what is the "new" data present inside field data that our original dataset did not have. This data is valuable because the computer vision models may not be performing well on this data. Once the "new" data has been figured out, it is added to the he original dataset at block 1215 and the model is retrained to become more robust and retransmitted to all devices 1235 to improve performances of the devices.

In an exemplary embodiment, the teacher student paradigm is followed for constantly improving our models. The smaller computationally cheaper model that resides on the device is referred to as the student model. Since instructions on the appliance need inferences to happen within seconds on our edge device, the student model is a shallower and hence because of that weaker model. Accordingly, for each instruction of a recipe train a pool of deeper models are trained on same data as the student. Since they are deeper they have better performance than student but also take larger inference time.

Every student model undergoes improvement through the teacher student pipeline via the following steps:

1. Images on which student inference ran during cooking sessions are fetched from the cloud.
2. Pool of teachers are then used to infer on these images and generate pool of teacher predictions.
3. Images are then auto-annotated on criteria of consensus amongst all teachers as well as mismatch between teacher and student predictions and moved to auto-annotation pipeline
4. For images where consensus is not reached, a manual annotation pipeline is used with expert intervention.
5. The auto annotation pipeline then triggers a retraining of latest version of the student model after appending the auto-annotated images to existing dataset.
6. The newly trained student is now pushed to all our devices after it satisfies the criteria of accuracy improvement on a held out test set.
7. Once the manual annotation is complete, it also triggers a retraining of latest version of the student model after appending the auto-annotated images to existing dataset.

Furthermore, reporting is used by trained recipe similarity models after cooking, using the image data gathered at step 1135 of method 1100, to determine at each step how close the recipe was to the standard recipe, and isolate similarities and differences at block 1225. A sample report is shown in FIG. 20 and discussed in the accompanying text. The recipe similarity framework generates how similar a user cooked recipe is to our in-house created recipe on a scale of 0-1. Each recipe may have a distinct similarity model in the cloud, which is trained in the following manner:

1. A Model (e.g., based on VGG19 architecture trained on ImageNet) is pre-trained on Amsterdam Library of Textures (ALOT) dataset using margin loss. The objective under which the model is trained is that score for pairs of images of same texture (anchor and positive) should be higher than the score for a pair of images each from different texture (anchor and negative).
2. This pre-trained similarity model is then tuned for each recipe.
3. For each recipe define stages at which recipe looks visually different from all the other stages are manually defined.
4. Base recipe sessions are defined, which are perfect examples of how the recipe should look at each stage.
5. Triplets of images are then curated, where anchor and positive are pairs of images of same stage from base recipes and negative is an image from a different stage.
6. The fine-tuned model is then pushed to the cloud by the appliance.

Upon successful completion of recipe, the similarity analysis is run which then performs the following steps:

1. Fetch visually distinct stages for recipe
2. Download images for base recipe stages
3. Download images for current recipe stages
4. Run similarity inference for each stages using base recipe image and current recipe image from same stage as a pair.
5. Compute similarity score as a mean score across all such pairs.

Finally, new recipes may be generated at block 1230. Using actual recipe data from the devices 1235, variants from the standard recipe may be logged, permitting the recipe generation model to insert new steps into existing recipes to generate new recipes.

Figure 13A:
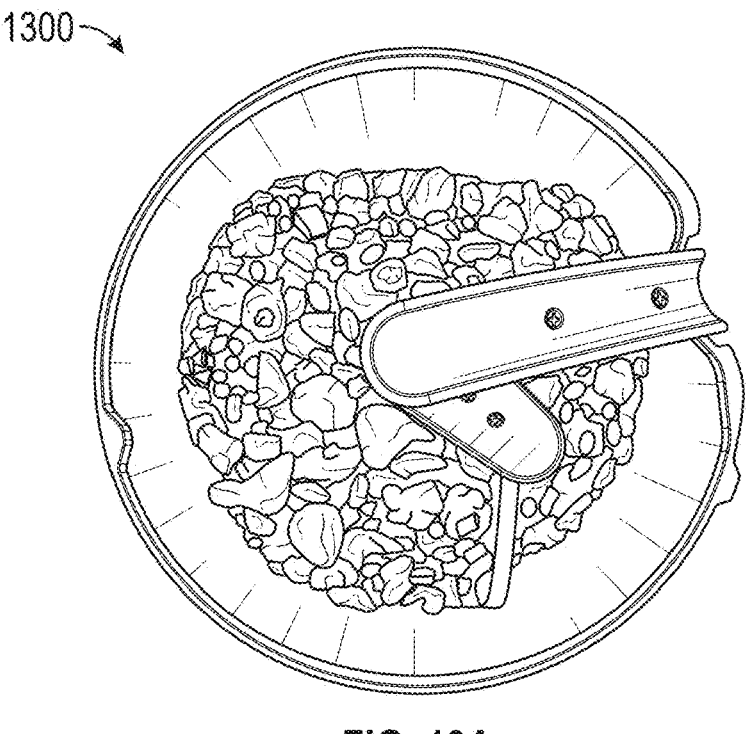
FIGS. 13A-13B illustrate an image of food in the pan of the countertop cooking appliance and the result of a pixel-by-pixel analysis of the image by a food segmentation model respectively, in an embodiment.
Figure 13B:
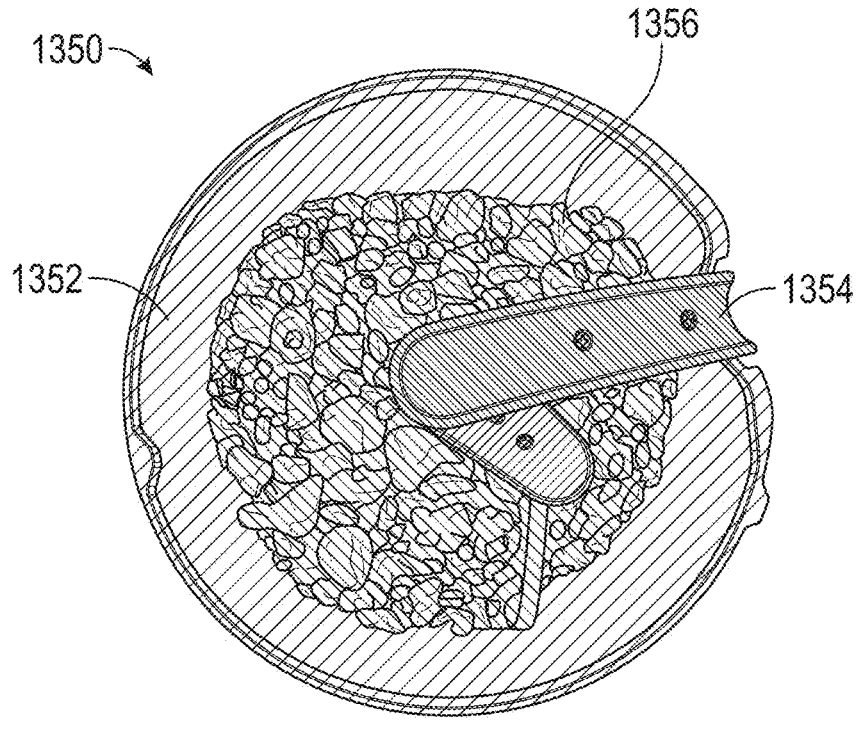

To identify ingredients in the pan and determine if a recipe step has been completed, a trained ingredient segmentation model may be used. FIGS. 13A-B illustrate an image of food 1300 in the pan of the countertop cooking appliance and the result of a pixel-by-pixel analysis of the image 1350 by a food segmentation model respectively, in an embodiment. The ingredient segmentation model (which may be based on Deeplabv3+Xception65 architecture pretrained on Pascal VOC segmentation dataset) in runtime segments regions of image between food (1356), stirrer (1354) and pan (1352). This model is used primarily for two instructions:

1. Ingredient Reduction

This instruction infers the incoming image using food segmentation model and observes the decrease in food area. Recipes are encoded with a target decrease mapped to desired level of doneness of the recipe. An example of this would be to cook tomatoes until they are reduced by 30% indicating they are cooked enough for that particular recipe to move onto the next step.

2. Gravy Thickness

This instruction infers the incoming image using food segmentation model and observes the increase in pan area while food is being stirred. Hypothesis here lies in the fact that the thicker the gravy is the more pan area will be observed during stirring. Recipes are encoded with a target increase mapped to desired level of thickness of gravy. An example would be giving a lesser target (increase in pan area) for soup and higher target for gravy dishes.

Figures 14A, 14B, 14C:
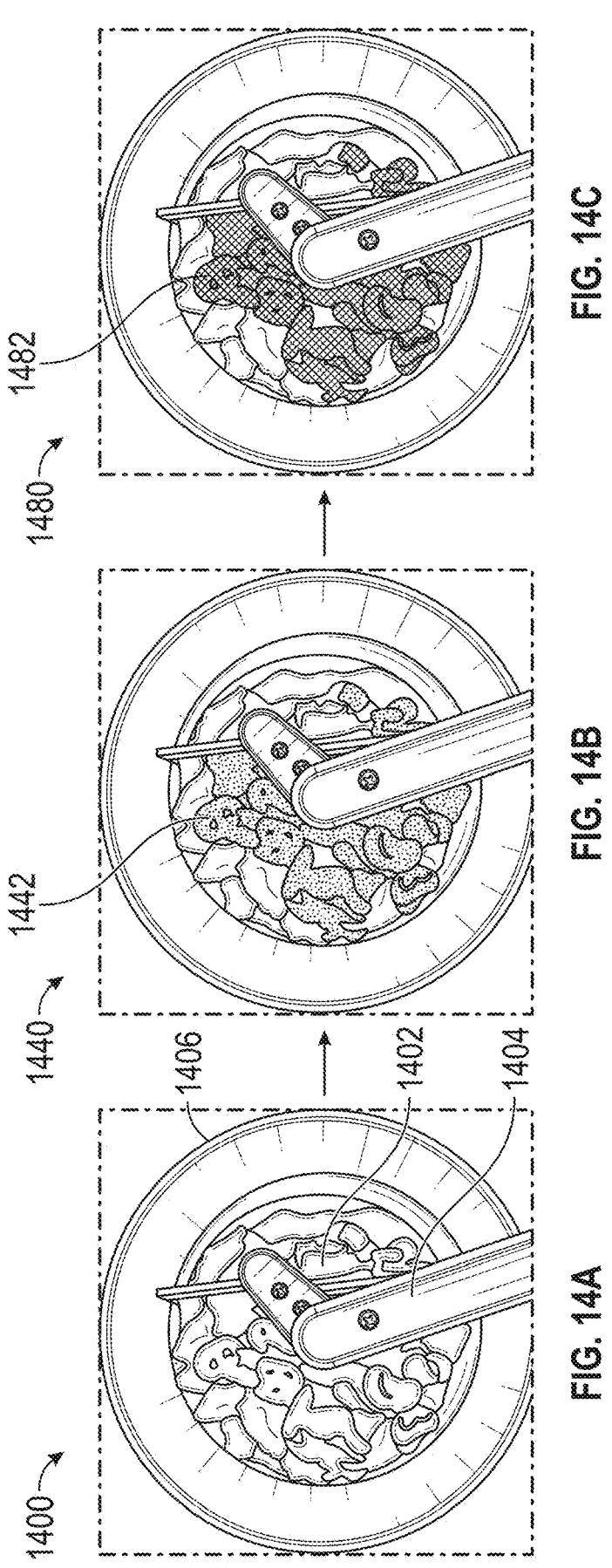
FIGS. 14A-14C illustrate images showing a) contents of the pan after completion of a step in a recipe, b) contents of the pan after addition of a new ingredient to the pan, and c) the contents of the pan after new ingredient addition with a pixel-by-pixel mask (generated by an ingredient segmentation model) overlaid to show differences in the pan before and after ingredient addition, in an embodiment.
Figures 15A, 15B, 15C, 15D:
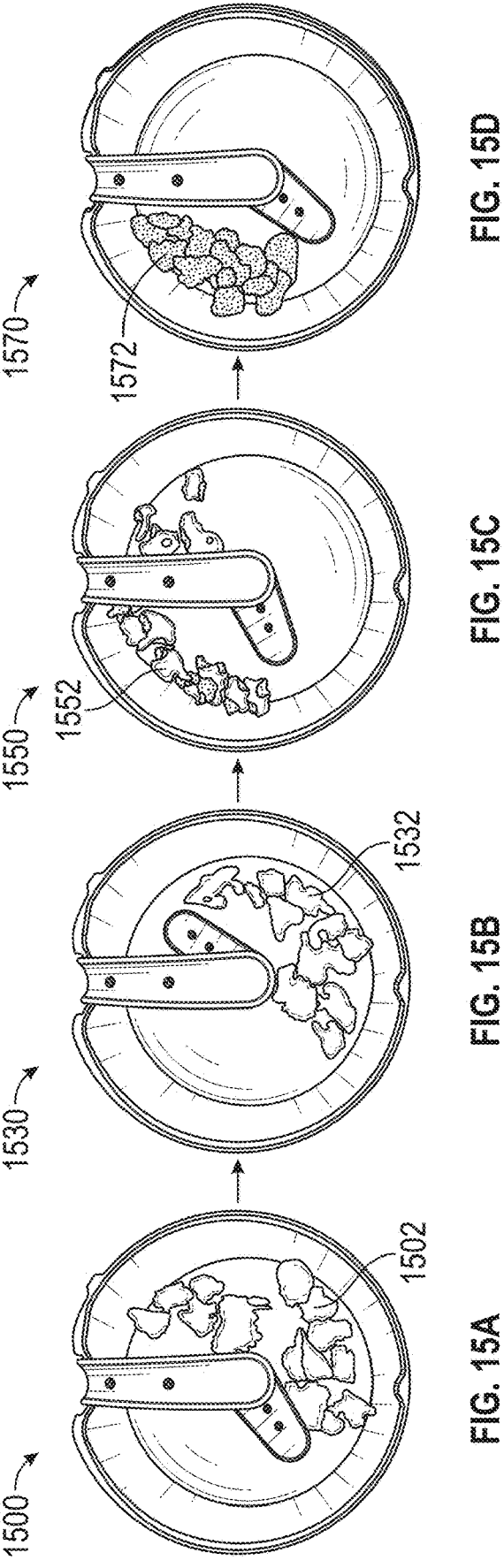
FIGS. 15A-15D illustrate exemplary images in a universal frying model training data set, in an embodiment.

After performing the segmentation for the first ingredient, the trained segmentation model repeats the process for additional ingredients. FIGS. 14A-C illustrate images showing: a) contents of the pan after completion of a step in a recipe 1400, b) contents of the pan after addition of a new ingredient to the pan 1440, and c) the contents of the pan after new ingredient addition with a pixel-by-pixel mask (generated by an ingredient segmentation model) overlaid to show differences in the pan before and after ingredient addition 1480, in an embodiment. As seen in the images, while stirrer 1404 is stirring first ingredient 1402, second ingredient 1442 is added. The trained segmentation model scans each pixel of image 1440, identifies differences, and generates a mask so that the second ingredient is identified accurately using the overlay 1482.

A second model used to determine if a step is completed is a trained universal frying model. The universal ingredient frying model (which may be based on Resnet34 architecture and pre-trained on ImageNet) has learned to map the level of browning of ingredient from 0 to 1, where 0 means the ingredient is raw and 1 means the ingredient is burnt. A frying model for a variety of ingredients like potato, broccoli, carrots, etc. is used. For each ingredient, a model is built in a two-stage manner. First, a dataset is created by manually collecting images of different ingredients at four different browning levels together with raw stage. The last browning level is where the ingredient is burnt. FIGS. 15A-D illustrate exemplary images in a universal frying model training data set, in an embodiment. As seen in the images, the training images include image 1500, where ingredient 1502 is raw, image 1530, where the ingredient 1532 has light brownness, image 1550 where the ingredient 1552 is thoroughly brown, and image 1570, where the ingredient 1572 is burnt. A model is trained using the entire pool of images. The model is trained using two objectives: i. Max Margin objective where pairs of images of an ingredient from same browning stage should get a higher score than any image from any previous browning stage of same ingredient. Images of raw and last browning stages may be trained using SmoothL1 loss with target of 0.0 and 1.0 respectively in an embodiment.

Figures 16A, 16B, 16C:
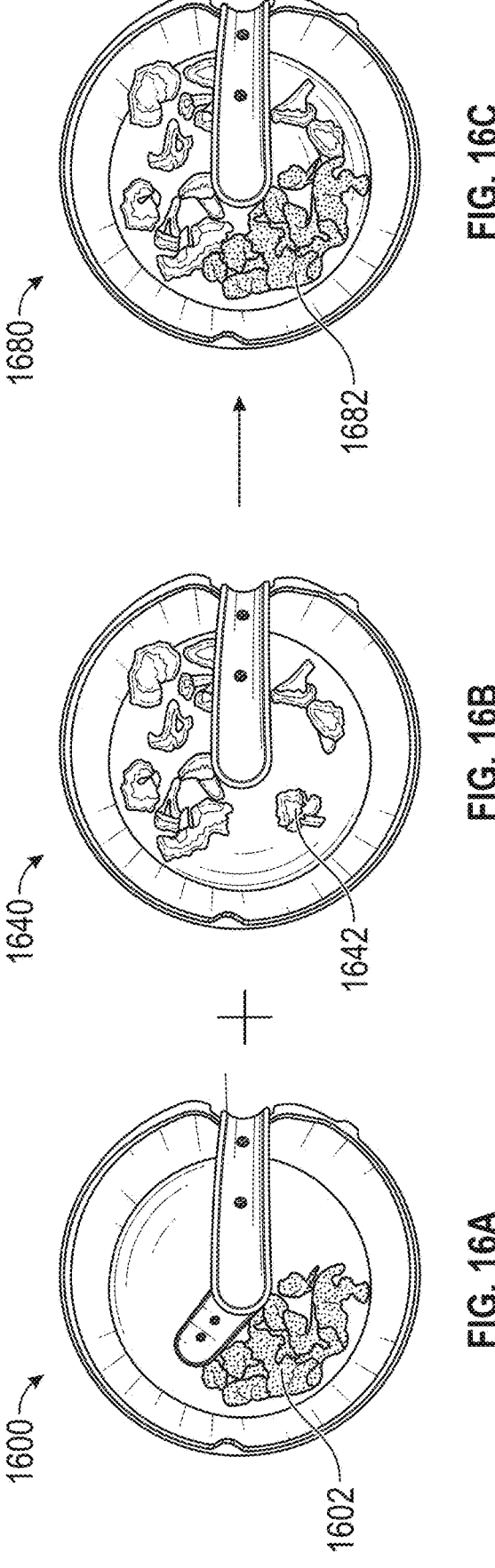
FIGS. 16A-16C illustrate images showing a) a real data image, b) a different real data image, and c) a synthetic image used to train a universal frying model, in an embodiment.

The unified browning model is then fine-tuned for each ingredient on images of that ingredient only. For the purpose of this fine-tuning synthetic images are generated. FIGS. 16A-C illustrate images showing a) a real data image 1602, b) a different real data image 1642, and c) a synthetic image 1682 used to train a universal frying model, in an embodiment. Two images of same/different browning levels 1600 and 1640 and the food pixels 1602 from the first image are pasted together with the food pixels 1642 of the other image, keeping track of what fraction of final corresponds to what browning level. For this synthetically generated image 1680, a browning score is generated by taking the weighted average of the browning scores. For instance, food region 1602 from burnt broccoli is pasted onto an image with raw broccoli 1642. Assuming the final image has equal area of raw broccoli as well as burnt broccoli, then this image is annotated in the training data set as having a label of 0.5 (0.5*0.0+0.5*1.0). The pre-trained model from the initial data set is then fine-tuned on these generated synthetic images and pushed to all cooking appliances from the cloud servers as the universal frying model for that ingredient.

A third trained model is the rice cooking model (which may be based on Deeplabv3+Xception65 architecture and pretrained on Pascal VOC segmentation dataset), which may be built on the hypothesis that if the right amount of water is used then by the time water is evaporated completely, the rice will be cooked (not before that and not after that). Water being present in the pan, which is in turn formulated as bubbles being present, since the pan is being heated continuously, can pose an issue. In order to detect bubbles, the problem is reformulated as the difference between two images. This is established on the assumption that when bubbles are present two consecutive images will have some differences. The rice cooking model functions substantially similarly to the universal frying model, except operates on a broader principle, where any difference is flagged, and step completion is identified as being when the differences become less than a predetermined threshold.

Returning to the ingredient segmentation model, as noted above, what happens as a part of this capability is that every pixel of the image captured by a camera is assigned to only one of the three buckets—Food-Pan-Stirrer. This helps the state completion model decide what part of the image is "the food part," help focus on those pixels only and ignore the rest. Further Computer Vision operations can only focus on this "food part" of the image increasing efficiency and speed. Now that the state completion model knows which part of the image is "the food part," it can now detect the color, shape, size of the food via pixel analysis and subsequently take actions based on that.

Other optimizations of the segmentation model include incorporating a cut size classification system. Different cut sizes influence cooking times and heat intensity needs. For example, minced ingredients require lower frying scores than diced ones to avoid overcooking. This system dynamically adapts frying times and intensities based on detected cut sizes preventing issues like burning or undercooking. To detect cut size, a trained multi-class classification model (e.g., SwinTransformerV2) on dataset collected in the kitchen and from past user sessions may be used. During augmentation, these images are pasted on top of random recipe base to bring diversity and counter overfitting while training over a very limited number of datapoints. Model is served in ONNX format on AWS for inference in an exemplary embodiment.

Another variation is a system that checks image clarity before invoking other models, such as food segmentation, ensuring that distorted or blurry images do not compromise any downstream applications. When blurriness is detected, the system temporarily pauses processing until a clear image is available. Reliable Model Inputs for Consistent Results: By maintaining high image quality, this system ensures stable and accurate input data for vision-based models, reducing the risk of erroneous predictions from other downstream models. Trained a binary-class classification model SwinTransformerV2 on dataset collected in the kitchen and from past user sessions. The same model is used during recipe and pre-check. Model is served in ONNX format on AWS for inference, in an exemplary embodiment.

In another variation of the computer vision models described above, a system provides immediate identification of dispensed items, allowing for accurate downstream processing, such as cut size classification. It serves as a foundational step in managing cooking processes, especially when new ingredients impact existing cooking dynamics. Real-Time Inventory and Adaptation: By localising newly added ingredients, the system maintains an updated inventory of pan contents, allowing it to adapt recipe instructions based on the changing composition of ingredients in the pan, thus supporting more flexible and interactive cooking. In an embodiment, a segmentation model Segformer trained on dataset annotated by Infolks collected in the kitchen and from past user sessions may be used. Model is served in ONNX format on AWS for inference in the exemplary embodiment.

Figure 17A:
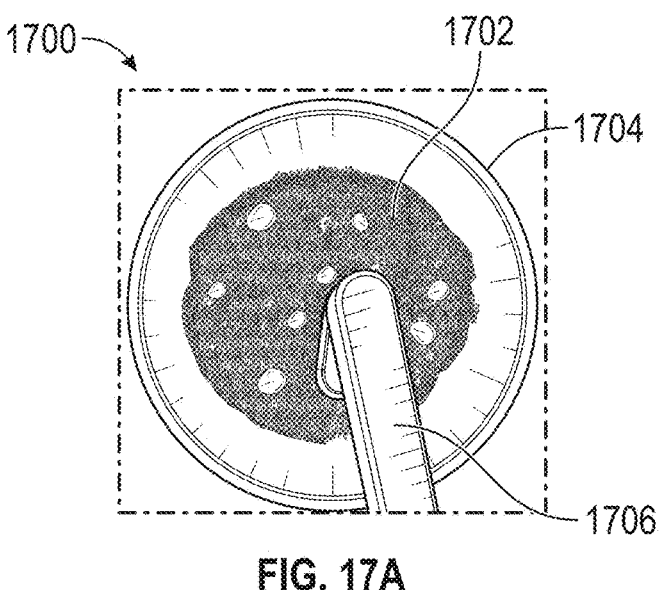
FIGS. 17A-17C illustrate images showing a) contents of the pan after completion of a step in a recipe, b) a pixel-by-pixel mask generated by a food segmentation model, and c) an overlaid image combining the original image and the mask, in an embodiment.
Figure 17B:
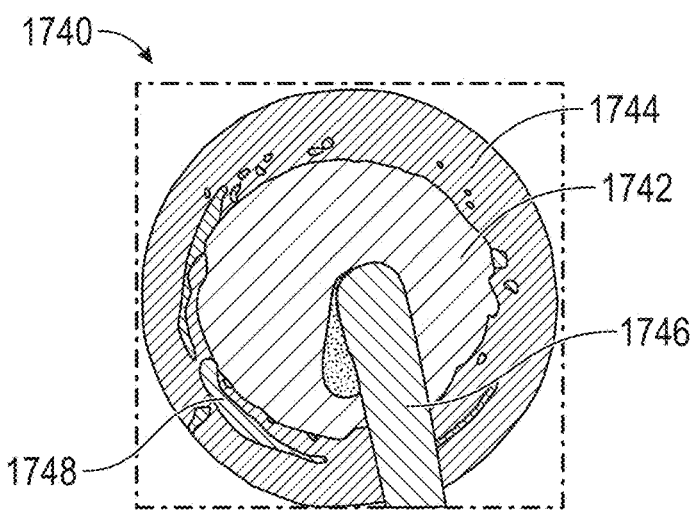
Figure 17C:
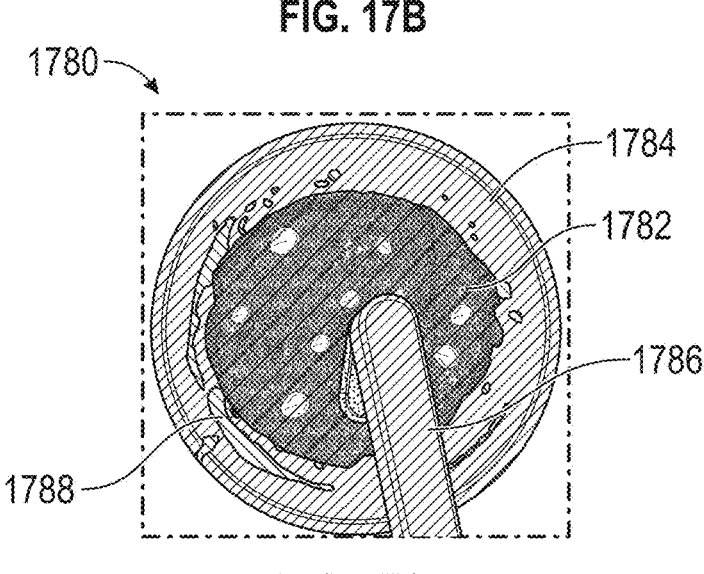
Figure 19A:
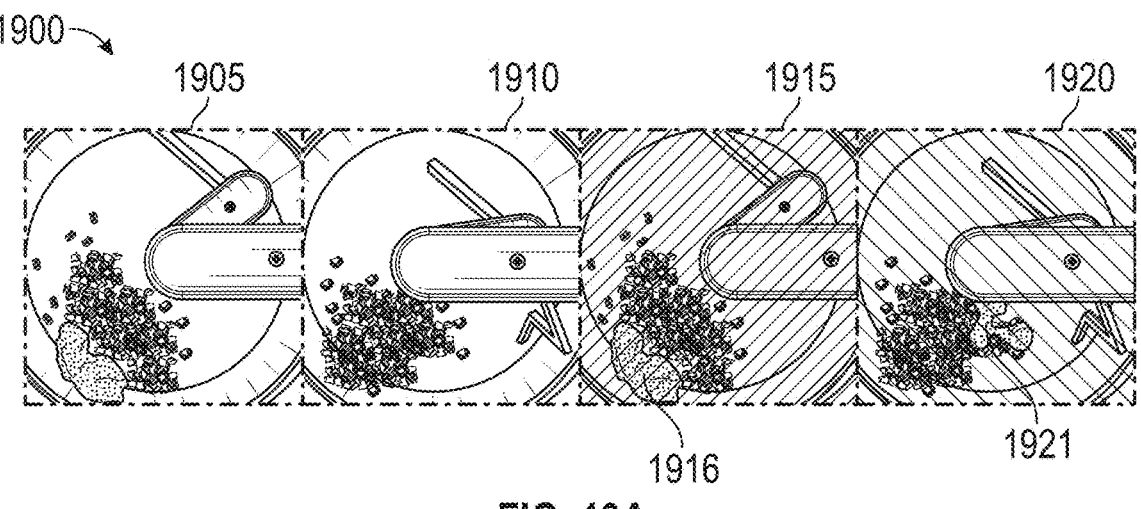
Figure 19B:
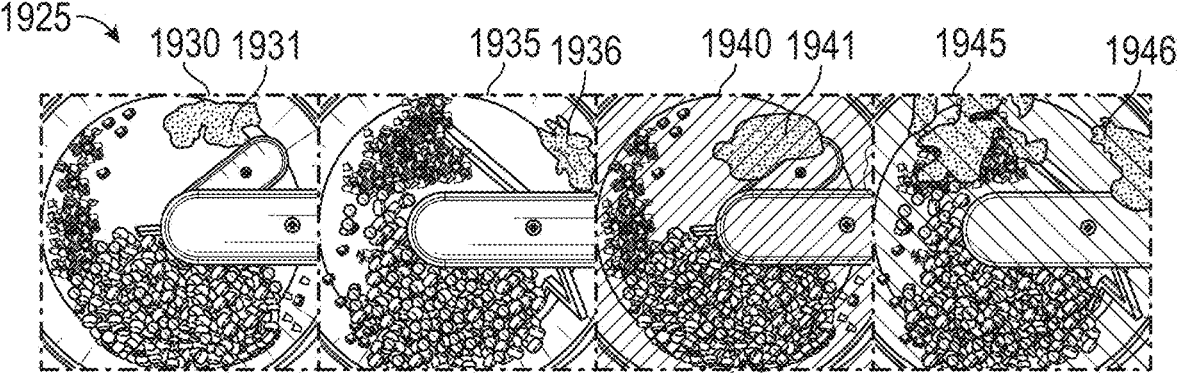
Figure 19C:
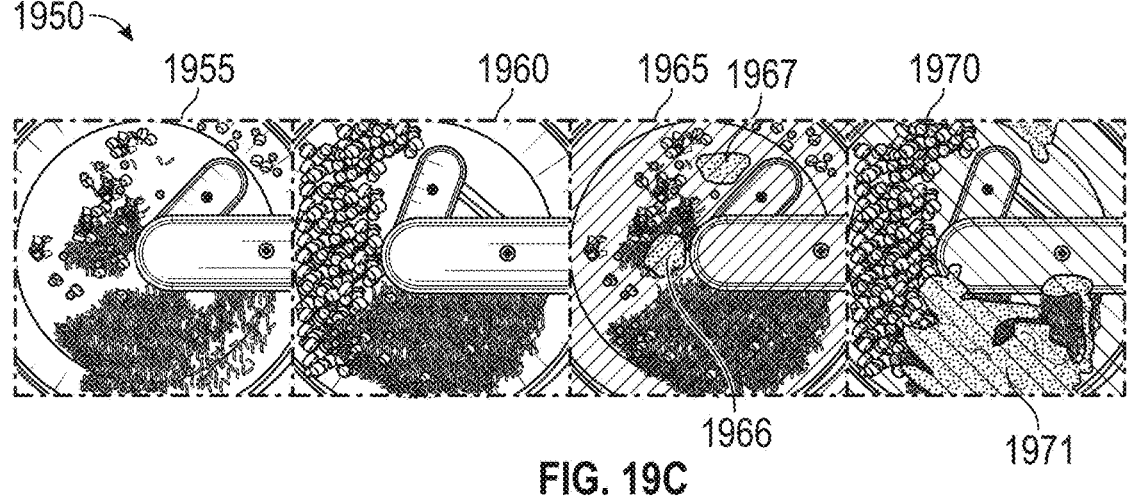

FIGS. 17A-C illustrate images showing a) contents of the pan after completion of a step in a recipe 1700, b) a pixel-by-pixel mask generated by a food segmentation model 1740, and c) an overlaid image combining the original image and the mask 1780, in an embodiment. The images show clearly how the segmentation model identifies the food 1782, the pan 1784, the stirrer 1786, and unclassified objects 1788, which may be classified as spatters, or sent to the cloud for further analysis.

FIGS. 18A-D illustrate showing pairs of images and their segmentation masks generated by a noodle lump detection model, in an embodiment. The model detects the lump 1802 formed in the noodle and generates the segmentation masks 1832 and 1834 from the model. After stirring, the lump 1852 may still be present, and is identified using segmentation mask 1872.

FIGS. 19A-E illustrates comparison images from a recipe similarity report for multiple steps of a recipe, in an embodiment. Each figure 1900, 1925, 1950, 1980, and 1990 represents a step of the recipe, and each image pair compares the standard recipe image 1905, 1930, 1955, 1982, and 1992 to the actual recipe image captured during cooking 1910, 1935, 1960, 1984, and 1994. The right pairs of images constitute difference images generated by the similarity model, where areas of difference are highlighted and used to generate a similarity score by the similarity model. The recipe comparison model training is focused on learning an embedding space using contrastive loss, where the goal is to differentiate between visually distinct instructions. The description of the four images per step provides additional context:

1. Inhouse View—Gold image
2. User View—User Session Image
3. Focus (Inhouse-User)—Focus areas of similarity model on gold image (low score means that focus area is missing in user session image).
4. Focus (User-Inhouse)—Focus areas of similarity model on user session image (low score means that focus area is missing in gold image).

FIG. 20 depicts an exemplary screenshot from a recipe similarity report. The recipe similarity model identifies ingredient features such as size/shape and color/texture by comparing user session images with predefined ingredient images stored for each step, primarily during dispense instructions in the database in text 2002. The model operates with a predefined list of required ingredient images for each recipe and maps the detected ingredients accordingly in images 2006, 2008, 2010, and 2012

Figure 21:
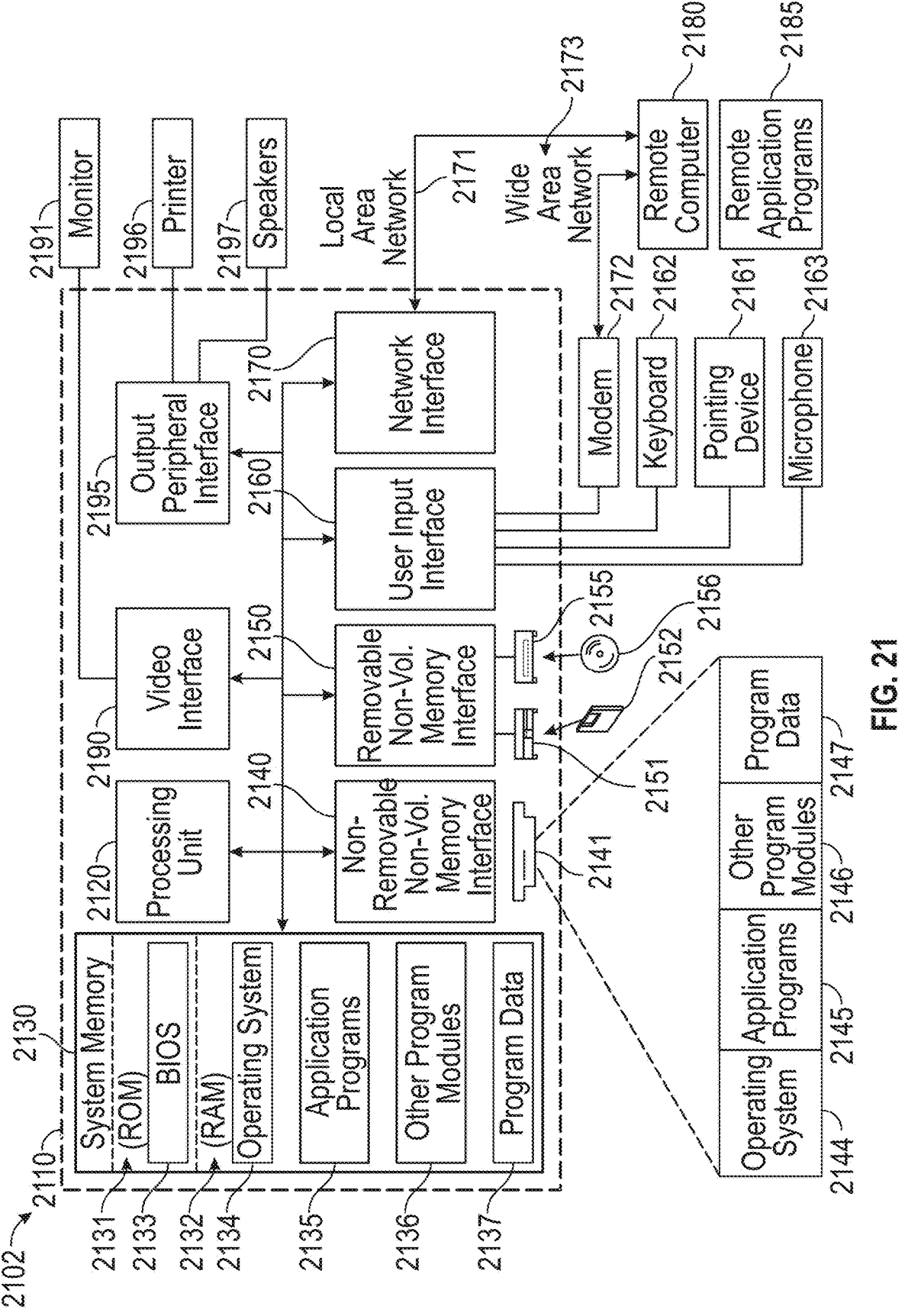
FIG. 21 depicts a block diagram illustrating an exemplary computing system for execution of the operations comprising various embodiments of the disclosure.

FIG. 21 depicts a block diagram illustrating an exemplary computing system 2100 for execution of the operations comprising various embodiments of the disclosure. The computing system 2102 is only one example of a suitable computing system, such as a mobile computing system, and is not intended to suggest any limitation as to the scope of use or functionality of the design. Neither should the computing system 2102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 2102 may be implemented as a mobile computing system such as one that is configured to run with an operating system (e.g., iOS) developed by Apple Inc. of Cupertino, California or an operating system (e.g., Android) that is developed by Google Inc. of Mountain View, California.

Some embodiments of the present invention may be described in the general context of computing system executable instructions, such as program modules, being executed by a computer. Generally, program modules include routines, programs, objects, components, data structures, etc., which perform particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

The computing system 2102 may include, but are not limited to, a processing unit 2120 having one or more processing cores, a system memory 2130, and a system bus 2121 that couples various system components including the system memory 2130 to the processing unit 2120. The system bus 2121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 2102 typically includes a variety of computer readable media. Computer readable media can be any available media that can be accessed by computing system 2102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 2102. Communication media typically embodies computer readable instructions, data structures, or program modules.

The system memory 2130 may include computer storage media in the form of volatile and/or nonvolatile memory such as read only memory (ROM) 2131 and random access memory (RAM) 2132. A basic input/output system (BIOS) 2133, containing the basic routines that help to transfer information between elements within computing system 2102, such as during start-up, is typically stored in ROM 2131. RAM 2132 typically contains data and/or program modules that are immediately accessible to and/or presently being operated on by processing unit 2120. By way of example, and not limitation, FIG. 21 also illustrates operating system 2134, application programs 2135, other program modules 2136, and program data 2137.

The computing system 2102 may also include other removable/non-removable volatile/nonvolatile computer storage media. By way of example only, computing system 2102 also illustrates a hard disk drive 2141 that reads from or writes to non-removable, nonvolatile magnetic media, a magnetic disk drive 2151 that reads from or writes to a removable, nonvolatile magnetic disk 2152, and an optical disk drive 2155 that reads from or writes to a removable, nonvolatile optical disk 2156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 2141 is typically connected to the system bus 2121 through a non-removable memory interface such as interface 2140, and magnetic disk drive 2151 and optical disk drive 2155 are typically connected to the system bus 2121 by a removable memory interface, such as interface 2150.

The drives and their associated computer storage media discussed above and illustrated in computing system 2102, provide storage of computer readable instructions, data structures, program modules and other data for the computing system 2102. In FIG. 21, for example, hard disk drive 2141 is illustrated as storing operating system 2144, application programs 2145, other program modules 2146, and program data 2147. Note that these components can either be the same as or different from operating system 2134, application programs 2135, other program modules 2136, and program data 2137. The operating system 2144, the application programs 2145, the other program modules 2146, and the program data 2147 are given different numeric identification here to illustrate that, at a minimum, they are different copies.

A user may enter commands and information into the computing system 2102 through input devices such as a keyboard 2162, a microphone 2163, and a pointing device 2161, such as a mouse, trackball or touchpad or touch screen. Other input devices (not shown) may include a joystick, gamepad, scanner, or the like. These and other input devices are often connected to the processing unit 2120 through a user input interface 2160 that is coupled with the system bus 2121, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2290.

The computing system 2202 may operate in a networked environment using logical connections to one or more remote computers, such as a remote computer 2180. The remote computer 2180 may be a personal computer, a hand-held device, a server, a router, a network PC, a peer device or other common network node, and typically includes many or all of the elements described above relative to the computing system 2102. The logical connections depicted in computing system 2102 include a local area network (LAN) 2171 and a wide area network (WAN) 2173, but may also include other networks. Such networking environments are commonplace in offices, enterprise-wide computer networks, intranets and the Internet.

When used in a LAN networking environment, the computing system 2102 may be connected to the LAN 2171 through a network interface or adapter 2170. When used in a WAN networking environment, the computing system 2102 typically includes a modem 2172 or other means for establishing communications over the WAN 2173, such as the Internet. The modem 2172, which may be internal or external, may be connected to the system bus 2121 via the user-input interface 2160, or other appropriate mechanism. In a networked environment, program modules depicted relative to the computing system 2102, or portions thereof, may be stored in a remote memory storage device. By way of example, and not limitation, FIG. 21 illustrates remote application programs 2185 as residing on remote computer 2180. It will be appreciated that the network connections shown are exemplary and other means of establishing a communications link between the computers may be used.

It should be noted that some embodiments of the present invention may be carried out on a computing system such as that described with respect to computing system 2102. However, some embodiments of the present invention may be carried out on a server, a computer devoted to message handling, handheld devices, or on a distributed system in which different portions of the present design may be carried out on different parts of the distributed computing system.

Another device that may be coupled with the system bus 2121 is a power supply such as a battery or a Direct Current (DC) power supply) and Alternating Current (AC) adapter circuit. The DC power supply may be a battery, a fuel cell, or similar DC power source that needs to be recharged on a periodic basis. The communication module (or modem) 2172 may employ a Wireless Application Protocol (WAP) to establish a wireless communication channel. The communication module 2172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A countertop cooking appliance comprising:
a macro ingredient delivery system;
a micro dispensing system comprising a plurality of pods having granular contents, a rotation element, and a pod rotation mechanism, the pod rotation mechanism moving a selected pod into a position above a pan, each pod comprising a dispensing section and a storage section, the rotation element rotating the selected pod and the selected pod dispensing an amount of granular content from the dispensing section with each rotation of the selected pod by the rotation element;
a stirrer comprising at least one spatula that gradually contacts substantially an entire area of one surface of the pan after the stirrer completes a rotation cycle;
a heating element located underneath the pan
a plurality of sensors oriented around the pan; and
control circuitry coupled to each of the macro ingredient delivery system, the micro dispensing system, the stirrer, the heating element, and the plurality of sensors, the control circuitry executing recipe methods by regulating amounts of ingredients inserted into the pan using the ingredient delivery system, regulating amounts of at least one granular content using the micro dispensing system, and monitoring and regulating operation of the stirrer and heating element using data from the plurality of sensors, the regulating amounts of the at least one granular content being performed by providing instructions to the micro dispensing system regarding a number of rotations to perform via the rotation element of the at least one granular content.

2. The countertop cooking appliance of claim 1, the stirrer rotating on an off-center orbital path that accesses substantially an entire inner surface of the pan.

3. The countertop cooking appliance of claim 2, the stirrer further comprising a fixed arm coupled to an eccentric arm, the eccentric arm being coupled to the at least one spatula and rotating around the fixed arm in a circular orbit, the at least one spatula separately rotating around the eccentric arm.

4. The countertop cooking appliance of claim 1 where the dispensing an amount of granular content within the dispensing section with each rotation of the selected pod by the rotation element is performed by:

engaging, by a hatch located on an outer surface of the selected pod, with a stationary feature of the micro dispensing system during rotation of the selected pod, the engaging causing the hatch to open;

dispensing, by the pod, the amount of granular content into the pan as the selected pod continues to rotate; and closing the hatch using a spring after dispensing the amount of granular content.

5. The countertop cooking appliance of claim 1, where the selected pod refills the dispensing section from the storage section during a portion of each rotation of the selected pod by the rotation element.

6. The countertop cooking appliance of claim 5 where the selected pod further comprises a funnel that guides the granular content during the portion of each rotation of the selected pod to the dispensing section.

7. The countertop cooking appliance of claim 1 where the control circuitry uses a PE sensor to confirm that the selected pod has been moved into the position above the pan.

8. The countertop cooking appliance of claim 1 where each pod is user-removable and refillable.

9. The countertop cooking appliance of claim 1 where the pod rotation system engages with the rotation element via a coupler, the pod rotation system being a carousel that permits the pods to freely traverse the coupler as the carousel is rotated.

10. The countertop cooking appliance of claim 1, the ingredient delivery system comprising a plurality of containers oriented around the pan, each container including a different ingredient and being coupled to a different ingredient motor, the ingredient motors moving in response to command signals from the control circuitry and emptying a selected ingredient when a request for the selected ingredient is received from the control circuitry.

11. The countertop cooking appliance of claim 10, the ingredient delivery system further comprising a common pan enclosure having an outer surface that separates the ingredient motors from the pan and blocks any food material from reaching the ingredient motors.

12. The countertop cooking appliance of claim 1, further comprising a liquid dispensing system coupled to the control circuitry, the liquid dispensing system comprising one or more liquid containers and a pump, the pump dispensing liquid from a selected liquid container in response to a command signal from the control circuitry.

13. The countertop cooking appliance of claim 1, further comprising an exhaust system coupled to the control circuitry, the exhaust system comprising a fan positioned above the pan and proximate to a camera sensor, the exhaust system sucking air away from the pan and the camera sensor in response to a command signal from the control circuitry.

14. The countertop cooking appliance of claim 1, the monitoring and regulating operation of the stirrer and heating element using data from the plurality of sensors comprising the control circuitry receiving visual data from a camera sensor and applying a trained computer vision model to the visual data, the trained computer vision model outputting state data pertaining to a state of food being cooked in the pan, the control circuitry responding to the state data by adjusting one of an ingredient amount, a granular content amount, stirring behavior, or heating behavior.

15. The countertop cooking appliance of claim 14, where the state data meeting a predetermined threshold triggers a next step of a recipe process.

16. The countertop cooking appliance of claim 1, in which the plurality of sensors includes a camera sensor oriented above the pan, the control circuitry including image processing circuitry that scans through image data received from the camera sensor to identify one or more visual cues associated with a current step of a recipe process.

17. The countertop cooking appliance of claim 16, where the visual cues are set based on a previously dispensed ingredient or granular content.

18. The countertop cooking appliance of claim 16, further comprising a lighting element located proximate to the camera sensor and coupled to the control circuitry, the lighting element providing light in response to a command signal from the control circuitry, the command signal being transmitted by the control circuitry when data from a lighting sensor indicates that camera performance may be degraded under current lighting conditions.

19. The countertop cooking appliance of claim 1, in which the control circuitry further stores sensor data obtained during a cooking process and transmits the stored sensor data to a cloud data server via a network connection.

20. The countertop cooking appliance of claim 1, in which the control circuitry, after a cooking process is complete, retrieves sensor data for food in the pan and applies a trained recipe mathematical model to the sensor data comparing the sensor data to previously-stored data associated with a target recipe, the trained recipe mathematical model outputting similarities to the target recipe and differences with the target recipe which the control circuitry uses to generate a displayable analysis report.

* * * * *